US010865132B2

(12) United States Patent
Ding et al.

(10) Patent No.: US 10,865,132 B2
(45) Date of Patent: Dec. 15, 2020

(54) APPARATUS AND METHOD TO CONTROL GOB WEIGHT, LENGTH AND/OR SHAPE

(71) Applicants: Xu Ding, Farmington, CT (US); Jonathan S. Simon, Pleasant Valley, CT (US)

(72) Inventors: Xu Ding, Farmington, CT (US); Jonathan S. Simon, Pleasant Valley, CT (US)

(73) Assignee: Emhart Glass, Steinhausen (CH)

( * ) Notice: Subject to any disclaimer, the term of this patent is extended or adjusted under 35 U.S.C. 154(b) by 176 days.

(21) Appl. No.: 16/103,767

(22) Filed: Aug. 14, 2018

(65) Prior Publication Data
US 2020/0055763 A1 Feb. 20, 2020

(51) Int. Cl.
C03B 9/14 (2006.01)
G05B 13/04 (2006.01)
C03B 9/41 (2006.01)
C03B 7/00 (2006.01)

(52) U.S. Cl.
CPC .......... C03B 9/41 (2013.01); C03B 9/14 (2013.01); G05B 13/041 (2013.01); C03B 7/005 (2013.01)

(58) Field of Classification Search
CPC .. C03B 9/41; C03B 7/005; C03B 7/08; C03B 7/10; C03B 7/14; C03B 9/32; Y10S 65/13; Y10S 425/808; G05B 19/40937; G05B 2219/45009; B07C 5/3408
See application file for complete search history.

(56) References Cited

U.S. PATENT DOCUMENTS

| 4,708,729 | A |   | 11/1987 | Cardenas-Franco et al. |
| 4,762,544 | A | * | 8/1988  | Davey ............... C03B 9/41 65/29.11 |
| 5,139,559 | A | * | 8/1992  | Kozora ............ C03B 9/1936 65/158 |
| 5,232,483 | A |   | 8/1993  | Tintle et al. |

(Continued)

FOREIGN PATENT DOCUMENTS

EP    1418158 A1    5/2004

OTHER PUBLICATIONS

De Larza and Hertzmann; Priortized Optimization for Task Space Control; 8 pages; The 2009 IEEE/RSJ International Conference on Intelligent Robots and Systems; Oct. 11-15, 2009 St. Louis, USA.

Primary Examiner — Kidest Bahta
(74) Attorney, Agent, or Firm — Reinhart Boerner Van Deuren P.C.

(57) ABSTRACT

An improved system and method for forming falling hot glass gobs which will be molded into glass containers in an Individual Section (IS) machine is disclosed which controls the weight, length, and shape of such glass gobs as they are produced. The system includes a gob feeder apparatus and a gob shearing mechanism a controller using models being used to correlate the effect of a number of feeder control settings on gob weight, length, and, shape. The controller is configured to adjust various feeder control settings based on a prioritized order of the feeder control settings such that gobs having different physical characteristics for different ones of the individual sections can be produced during a single machine cycle. By implementing the models, a closed loop system has been developed to set up controls to achieve the desired gob forming for each individual section and cavity.

38 Claims, 7 Drawing Sheets

(56) References Cited

U.S. PATENT DOCUMENTS

| | | | |
|---|---|---|---|
| 6,199,405 B1 | 3/2001 | Buettiker | |
| 7,350,379 B2 | 4/2008 | Ueda et al. | |
| 2003/0131628 A1* | 7/2003 | Murakami | C03B 7/10 |
| | | | 65/21.2 |
| 2005/0268654 A1 | 12/2005 | Hasse | |
| 2006/0213226 A1* | 9/2006 | Hartmann | C03B 7/086 |
| | | | 65/29.11 |
| 2014/0000317 A1* | 1/2014 | Kuz | C03B 9/41 |
| | | | 65/164 |

* cited by examiner

APPARATUS AND METHOD TO CONTROL GOB WEIGHT, LENGTH AND/OR SHAPE

FIELD OF THE INVENTION

The present invention relates generally to the apparatus that forms falling hot glass gobs which will be molded into glass containers in an Individual Section (IS) machine, and more particularly to an improved system and method for controlling the weight, length, and/or shape of such glass gobs as they are produced from apparatus including a gob feeder apparatus and a gob shearing mechanism.

BACKGROUND OF THE INVENTION

Glass containers are made in a manufacturing process that has three distinct operations, namely the batch house, the hot end, and the cold end. The batch house is where the raw materials for glass (which are typically sand, soda ash, limestone, feldspar, cullet (crushed, recycled glass), and other raw materials) are prepared and mixed into batches. The hot end melts the batched materials into molten glass, distributes discrete segments of molten glass referred to in the industry as glass "gobs" to molding apparatus where they are molded into glass containers, and anneals the glass containers to prevent them from being weakened due to stresses caused by uneven cooling. The cold end inspects the glass containers to ensure that they are of acceptable quality.

Typically, the molding portion of the hot end of the manufacturing process is performed in an Individual Section or IS forming machine, which contains between five and twenty identical sections, each of which is capable of making one, two, three, or four containers simultaneously.

The hot end begins with a furnace, in which the batched materials are melted into molten glass, and supplied to a gob feeder apparatus from which streams of molten glass flow through a feeder bowl to multiple outlets. Since each section of an IS machine has one, two, three, or four sets of molding apparatus which will operate simultaneously, one, two, three, or four outlets from the feeder will simultaneously supply streams of molten glass to these respective sets of molding apparatus. Each of the streams of molten glass is cut with a shearing mechanism located below the feeder bowl into uniform roughly cylindrical segments of glass called gobs, which fall by gravity and are guided through scoops, troughs, and deflectors into their respective blank (or parison) molds in the section of the IS machine.

In each set of blank molds, a pre container referred to as a parison is formed, either by using a metal plunger to push the glass gob into the blank mold, or by blowing the glass gob out from below into the blank mold. The parison is then inverted and it is transferred to a second or blow mold, where the parison is blown out into the shape of the finished glass container. The blown parison is then cooled in the blow mold to the point where it is sufficiently rigid to be gripped and removed from the blow station.

The general focus of the present invention is on the apparatus that produces the falling hot glass gobs, which includes the gob feeder apparatus and the shearing mechanism, and particularly on the operating parameters used to control the operations of the gob feeder apparatus and the shearing mechanism to thereby control the weight, length, and shape of each of the gobs produced with a high degree of accuracy.

A gob feeder is shown in part in U.S. Pat. No. 6,199,405, to Buettiker, which is assigned to the assignee of the present patent application, and which is hereby incorporated herein in its entirety by reference, and is better shown schematically in U.S. Pat. No. 7,350,379, to Ueda et al., which is also hereby incorporated herein in its entirety by reference. A shearing mechanism is shown in U.S. Pat. No. 5,232,483, to Tintle et al., which is assigned to the assignee of the present patent application, and which is hereby incorporated herein in its entirety by reference, and is also shown schematically in the Ueda et al. patent referenced herein.

The gob feeder holds molten glass in a refractory spout bowl having (typically three) vertical discharge orifice holes located in the bottom of an orifice ring located at a neck opening at the bottom of the spout bowl. Molten glass contained in the spout bowl has a temperature from 1100 to 1200 degrees C., typically, so that it has a desired viscosity.

A cylindrical feeder tube is lowered into the molten glass in the spout bowl toward the discharge orifice holes. Plunger needles are reciprocated downwardly and upwardly through the feeder tube based on cam profiles, typically electronic position vs. time signals for controlling a motor that operably drive the plunger needles, to respectively advance and retract them toward and away from the discharge orifice holes to cause glass streams to be emitted from the discharge apertures in a manner to control the glass flow pattern and amount passing through the orifice holes.

The insertion depth of the cylindrical feeder tube in the molten glass in the feeder bowl may be adjusted to a desired position (height) therein. The height positions (an upper limit and a lower limit) of the plunger needles and the stroke of the plunger needles may also be adjusted. Reciprocating pairs of servo-driven parallel shear blades located below the feeder bowl that have opposed engageable cutting edges are located below the discharge orifice holes, and are reciprocated to cut the molten glass streams emitted from the discharge orifice holes into hot glass gobs, finalizing the glass gob forming process. The shear blades are typically cooled by a mist of cooling liquid. The operation and timing of the shear blades is adjustable.

The plunger needle motion pattern including the motion cam, the plunger height, plunger stroke, plunger physical size and shape, and the shearing time will determine the gob weight, length, and shape of the gob that is formed. The key control parameters to adjust feeder plunger motion include the plunger height, the plunger stroke, the start delay, the early end, and correction angles.

It will be recognized by those skilled in the art that it is desirable to optimize the operation of the gob feeder and the shearing mechanism to produce glass gobs of uniform quality and characteristics. As might be expected, several attempts have been made to date to do so.

U.S. Pat. No. 4,708,729, to Cardenas-Franco et al., discloses the general concept of attempting to control the weight and shape of glass gobs in a molten glass feeder using tube height, rotation speed, plunger stroke, shearing speed, temperature, and glass viscosity. However, it is incapable of continuously using an algorithm to control the feeder parameters to influence gob forming and improve the operation of the gob feeder.

U.S. Patent Application Publication No. 2005/0268654, to Haase et al., discloses modifying the mass of successive gobs by varying the time interval from shear cut to shear cut in order to produce a product range of a number of glass objects of different weights. A predetermined time section of the feeder head operation which has a relevant number of gobs to be produced is divided into intervals from shear cut to shear cut, depending on the ratio of the desired gob masses to produce a range of products. However, this approach is incapable of improving the quality or uniformity of the glass gobs produced.

U.S. Patent Application Publication No. 2006/0213226, to Hartmann et al., discloses a method and a device for controlling gob mass, wherein the plunger in the feeder head uses a changeable plunger movement to influence the discharge of molten glass from the feeder head. Based upon a mass reference value difference, the plunger movement profile (including the plunger height and the plunger stroke) is modified. This approach is solely directed at creating gobs of a uniform mass, and as such does not achieve the quality or the uniformity of shape of the glass gobs produced.

It will thus be appreciated that it would be desirable to provide a system and method to automatically and continuously control a plurality of parameters algorithmically to control the glass feeder and shearing mechanism to form glass gobs of optimal quality and uniformity (including one or more of the correct gob weight, gob length, gob shape, and gob temperature) for each forming section and cavity on a glass container machine. Further, it is desirable to be able to provide gobs of different weight, length and shape to different individual sections of the IS machine, so as to be able to form containers that require starting with gobs of different physical characteristics.

The subject matter discussed in this background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

BRIEF SUMMARY OF THE INVENTION

The disadvantages and limitations of the background art discussed above are overcome by the present invention. With this invention, a system and method are provided to automatically and continuously control a plurality of parameters algorithmically to control the glass feeder and shearing mechanism to form glass gobs of optimal quality and uniformity (including one or more of the correct gob weight, gob length, gob shape, and gob temperature) for each forming section and cavity on a glass container machine.

In a particular embodiment, a control arrangement for controlling a system for producing gobs for an individual section machine is provided. The individual section machine has a plurality of sections including at least a first section and at least a second section. The system cyclically producing a set of gobs including at least one gob for each of the plurality of sections including at least one first gob for the first individual section and at least one second gob for the second individual section. Each gob has a predetermined first physical characteristic value. The system producing gobs includes: (1) a gob feeder apparatus and (2) a gob shearing mechanism. The gob feeder apparatus has: (A) a spout bowl with at least one discharge orifice hole located in the bottom thereof; (B) a cylindrical feeder tube within the spout bowl; (C) a cylindrical feeder tube vertical adjustment arrangement for adjusting the vertical offset of the cylindrical tube feeder relative to the bottom of the spout bowl; (D) at least one plunger needle located within the feeder tube above the at least one discharge orifice hole; and (E) a drive arrangement operably coupled to the at least one plunger needle to reciprocally drive the plunger needle toward and away from the discharge orifice hole to emit at least one molten glass stream. The gob shearing mechanism has a reciprocating shear blade located below the spout bowl to repeatedly cut the at least one molten glass stream emitted from the discharge orifice hole to form the gobs that form the set of gobs. The control arrangement includes a controller configured to cyclically control, based on a set of feeder control settings for forming the set of gobs: A) actuation of the drive arrangement to reciprocally drive the at least one plunger needle towards and away from the discharge orifice hole; B) actuation of the reciprocating shear blade; and C) actuation of the cylindrical feeder tube vertical adjustment arrangement to control a vertical offset of the cylindrical feeder tube relative to the bottom of the spout bowl. The controller is configured to determine the set of feeder control settings by determining and using an optimal and feasible set of feeder control setting deviations which is a set of deviations from a set of predetermined nominal feeder control settings. A magnitude of each feeder control setting deviation has a deviation magnitude range of between zero deviation and a maximum deviation from the corresponding nominal feeder control setting. The feeder control setting deviations have a predetermined priority order from lowest priority to highest priority. The optimal and feasible set of feeder control setting deviations is feasible if the set of feeder control settings that are determined using the optimal and feasible set of feeder control setting deviations will create the set of gobs with each gob having the corresponding predetermined first physical characteristic value and is optimal if a magnitude of any one of the feeder control setting deviations within the set of feeder control setting deviations is reduced, a magnitude of a feeder control setting deviation having a lower priority must be increased for the set of feeder control setting deviations to be feasible.

In one embodiment, the predetermined first physical characteristic value of the at least one first gob is different than the predetermined first physical characteristic value of the at least one second gob.

In one embodiment, the set of feeder control settings includes a first subset of feeder control settings that is all of the uniquely determinable feeder control settings for forming the at least one first gob and the set of feeder control settings includes a second subset of feeder control settings that is all of the uniquely determinable feeder control settings for forming the at least one second gob. The at least one of the uniquely determinable feeder control settings of the first subset is different than a corresponding at least one of the uniquely determinable feeder control settings of the second subset such that the predetermined first physical characteristic values of the at least one first and second gobs are different.

In one embodiment, the lowest priority feeder control setting deviation corresponds to the least desirable feeder control setting to be adjusted from the corresponding nominal feeder control setting and the highest priority feeder control setting deviation corresponds to the most desirable feeder control setting to be adjusted from the corresponding nominal feeder control setting.

In one embodiment, the controller sequentially determines each of the optimal feeder control setting deviations to determine the optimal and feasible set of feeder control setting deviations. The controller determines the optimal feeder control setting deviation for the least preferred feeder control setting deviation first and the optimal feeder control setting deviation for the most preferred feeder control setting deviation last. The controller uses all optimal feeder control setting deviations of the optimal and feasible set of feeder control setting deviations that have been previously determined for determining each subsequent optimal feeder control setting deviation until the controller determines the optimal feeder control setting deviation for the most preferred feeder control setting deviation.

In one embodiment, at least one of the feeder control setting deviations is in the form of a vector. The vector has a uniquely determinable component for forming each of the plurality of gobs.

In one embodiment, at least one of the feeder control setting deviations is in the form of a scalar that is applicable for forming all of the plurality of gobs.

In one embodiment, the set of feeder control settings includes feeder control settings for defining a cyclical motion profile of the at least one plunger needle to cyclically reciprocally drive the at least one plunger needle towards and away from the discharge orifice hole. The cyclical motion profile having a motion profile portion for each gob in the set of gobs. Each motion profile portion having a period forming the corresponding gob. The set of feeder control settings includes a feeder control setting for defining actuation timing of the reciprocating shear blade for forming each gob of the set of gobs relative to the corresponding motion profile of the gob. The set of feeder control settings includes the vertical offset of the cylindrical feeder tube for forming each gob of the set of gobs.

In one embodiment, the vertical offset is constrained to be the same for forming all gobs of the set of gobs.

In one embodiment, the controller determines, for each motion profile portion: i) a plunger stroke; ii) a plunger start time, which is a time within and proximate a beginning of the period of the motion profile portion at which the plunger needle begins to move away from the bottom of the spout bowl; iii) a plunger end time, which is a time within and proximate an end of the period of the motion profile portion at which the plunger needle stops moving toward the bottom of the spout bowl; and iv) a plunger needle height, which is a distance between the plunger needle and the spout bottom at the plunger start time.

In one embodiment, a combined number of adjustable feeder control settings is greater than the combined number of predetermined physical characteristic values used to determine the feeder control settings.

In one embodiment, the actuation timing of the reciprocating shear blade is a shear differential, which is an offset of the actuation timing of the gob shearing mechanism relative to the plunger end time for each motion profile portion.

In one embodiment, the system of producing gobs for an individual section machine simultaneously produces a plurality of gobs to be supplied to a same section (e.g. a multi gob system). The spout bowl includes a plurality of discharge orifice holes corresponding to the plurality of gobs. The at least one plunger needle includes a plurality of plunger needles corresponding to the plurality of discharge orifices. The drive arrangement is operably coupled to the plurality of plunger needles to simultaneously reciprocally drive the plunger needles toward and away from the discharge orifice holes to cyclically emit a plurality of molten glass streams corresponding to the plurality of discharge orifices. The controller is configured such that the predetermined priority order reduces differences between the simultaneously produced plurality of gobs for each section.

In one embodiment, each gob to be formed has a predetermined second physical characteristic value in addition to the predetermined first physical characteristic. The controller determines the set of feeder control settings for forming the set of gobs such that the optimal and feasible set of feeder control setting deviations is feasible if the set of feeder control settings that are determined using the optimal and feasible set of feeder control setting deviations will create the set of gobs with each gob having the predetermined first physical characteristic value and the second physical characteristic value.

In one embodiment, the predetermined first physical characteristic value is gob weight and the predetermined second physical characteristic value is gob length.

In one embodiment, the predetermined first physical characteristic is one of gob weight, gob length and gob shape.

In one embodiment, the controller includes a prioritized optimizer that determines the set of feeder control settings using the first physical characteristic values of the set of gobs as an input to the prioritized optimizer; the controller is configured to compare actual measured first physical characteristic values for the set of gobs formed using a set of feeder control setting generated by the prioritized optimizer with the predetermined first physical characteristic values used to generate the set of feeder control settings to determine first physical characteristic value errors; and the controller is configured to adjust the predetermined first physical characteristic values used by the prioritized optimizer to determine a subsequent set of feeder control settings for forming a subsequent set of gobs.

In one embodiment, the controller includes a prioritized optimizer that determines the set of feeder control settings using the first physical characteristic values of the set of gobs as an input to the prioritized optimizer; the controller includes a feeder model that determines predicted first physical characteristic values for the set of actual gobs formed using the set of feeder control settings generated by the prioritized optimizer; the controller is configured to compare actual measured first physical characteristic values for the set of gobs formed with the predicted first physical characteristic values generated by the feeder model to determine first physical characteristic value errors; and the controller is configured to adjust the predetermined first physical characteristic values used by the prioritized optimizer to determine a subsequent set of feeder control settings for forming a subsequent set of gobs.

In one embodiment, the prioritized optimizer maintains the set of feeder control settings within operational limits that can result in actual gobs being formed at different than the desired first physical characteristic values.

In a further embodiment, a system for producing gobs for an individual section machine having a plurality of sections including at least a first section and at least a second section is provided. The system cyclically produces a set of gobs including at least one gob for each of the plurality of sections including at least one first gob for the first individual section and at least one second gob for the second individual section. Each gob has a predetermined first physical characteristic value. The system producing gobs includes a gob feeder apparatus, a gob shearing mechanism and a control arrangement. The gob feeder apparatus has a spout bowl with at least one discharge orifice hole located in the bottom thereof; a cylindrical feeder tube within the spout bowl; a cylindrical feeder tube vertical adjustment arrangement for adjusting the vertical offset of the cylindrical tube feeder relative to the bottom of the spout bowl; at least one plunger needle located within the feeder tube above the at least one discharge orifice hole; and a drive arrangement operably coupled to the at least one plunger needle to reciprocally drive the plunger needle toward and away from the discharge orifice hole to emit at least one molten glass stream. The gob shearing mechanism is located below the spout bowl to repeatedly cut the at least one molten glass stream emitted from the discharge orifice hole into the plurality of gobs. The control arrangement is any one of the control arrangement embodiments outlined above.

A method of controlling a system for producing gobs for an individual section machine is provided. The individual section machine is as outlined above. The method includes: cyclically controlling, with a controller, based on a set of feeder control settings for forming the set of gobs: A) actuation of the drive arrangement to reciprocally drive the at least one plunger needle towards and away from the discharge orifice hole; B) actuation of the reciprocating shear blade; and C) actuation of the cylindrical feeder tube vertical adjustment arrangement to control a vertical offset of the cylindrical feeder tube relative to the bottom of the spout bowl. The method includes determining, by the controller, the set of feeder control settings by determining and using an optimal and feasible set of feeder control setting deviations which is a set of deviations from a set of predetermined nominal feeder control settings. A magnitude of each feeder control setting deviation has a deviation magnitude range of between zero deviation and a maximum deviation from the corresponding nominal feeder control setting, the feeder control setting deviations having a predetermined priority order from lowest priority to highest priority. The optimal and feasible set of feeder control setting deviations is feasible if the set of feeder control settings that are determined using the optimal and feasible set of feeder control setting deviations will create the set of gobs with each gob having the corresponding predetermined first physical characteristic value and is optimal if a magnitude of any one of the feeder control setting deviations within the set of feeder control setting deviations is reduced, a magnitude of a feeder control setting deviation having a lower priority must be increased for the set of feeder control setting deviations to be feasible.

In one method, the predetermined first physical characteristic value of the at least one first gob is different than the predetermined first physical characteristic value of the at least one second gob.

In one method, the set of feeder control settings includes a first subset of feeder control settings that is all of the uniquely determinable feeder control settings for forming the at least one first gob; the set of feeder control settings includes a second subset of feeder control settings that is all of the uniquely determinable feeder control settings for forming the at least one second gob; and at least one of the uniquely determinable feeder control settings of the first subset is different than a corresponding at least one of the uniquely determinable feeder control settings of the second subset such that the predetermined first physical characteristic values of the at least one first and second gobs are different.

In one method, the lowest priority feeder control setting deviation corresponds to the least desirable feeder control setting to be adjusted from the corresponding nominal feeder control setting and the highest priority feeder control setting deviation corresponds to the most desirable feeder control setting to be adjusted from the corresponding nominal feeder control setting.

In one method, determining an optimal and feasible set of feeder control setting deviations includes: sequentially determining each of the optimal feeder control setting deviations to determine the optimal and feasible set of feeder control setting deviations by determining the optimal feeder control setting deviation for the least preferred feeder control setting deviation first and determining the optimal feeder control setting deviation for the most preferred feeder control setting deviation last; and determining each of the optimal feeder control setting deviations includes using all optimal feeder control setting deviations of the optimal and feasible set of feeder control setting deviations that have been previously determined for determining each optimal feeder control setting deviation until the controller determines the optimal feeder control setting deviation for the most preferred feeder control setting deviation.

In one method, at least one of the feeder control setting deviations is in the form of a vector, the vector having a uniquely determinable component for forming each of the plurality of gobs.

In one method, at least one of the feeder control setting deviations is in the form of a scalar that is applicable for forming all of the plurality of gobs.

In one method, the set of feeder control settings includes feeder control settings for defining a cyclical motion profile of the at least one plunger needle to cyclically reciprocally drive the at least one plunger needle towards and away from the discharge orifice hole, the cyclical motion profile having a motion profile portion for each gob in the set of gobs, each motion profile portion having a period forming the corresponding gob; the set of feeder control settings includes a feeder control setting for defining actuation timing of the reciprocating shear blade for forming each gob of the set of gobs relative to the corresponding motion profile of the gob; and the set of feeder control settings includes the vertical offset of the cylindrical feeder tube for forming each gob of the set of gobs.

In one method, the vertical offset is constrained to be the same for forming all gobs of the set of gobs.

In one method, determining the set of feeder control settings includes determining, with the controller, for each motion profile portion: i) a plunger stroke; ii) a plunger start time, which is a time within and proximate a beginning of the period of the motion profile portion at which the plunger needle begins to move away from the bottom of the spout bowl; iii) a plunger end time, which is a time within and proximate an end of the period of the motion profile portion at which the plunger needle stops moving toward the bottom of the spout bowl; and iv) a plunger needle height, which is a distance between the plunger needle and the spout bottom at the plunger start time.

In one method, a combined number of adjustable feeder control settings that is determined is greater than the combined number of predetermined physical characteristic values used to determine the feeder control settings.

In one method, the actuation timing of the reciprocating shear blade is a shear differential, which is an offset of the actuation timing of the gob shearing mechanism relative to the plunger end time for each motion profile portion.

In one method, the system of producing gobs for an individual section machine simultaneously produces a plurality of gobs for one of the plurality of sections, the spout bowl includes a plurality of discharge orifice holes corresponding to the plurality of gobs, the at least one plunger needle includes a plurality of plunger needles corresponding to the plurality of discharge orifices, the drive arrangement is operably coupled to the plurality of plunger needles to simultaneously reciprocally drive the plunger needles toward and away from the discharge orifice holes to cyclically emit a plurality of molten glass streams corresponding to the plurality of discharge orifices, the controller is configured such that the predetermined priority order reduces differences between the simultaneously produced plurality of gobs for each section.

In one method, each gob to be formed has a predetermined second physical characteristic value in addition to the predetermined first physical characteristic, the controller determines the set of feeder control settings for forming the set of gobs such that the optimal and feasible set of feeder control setting deviations is feasible if the set of feeder control settings that are determined using the optimal and feasible set of feeder control setting deviations will create the set of gobs with each gob having the predetermined first physical characteristic value and the second physical characteristic value.

In one method, the predetermined first physical characteristic value is gob weight and the predetermined second physical characteristic value is gob length.

In one method, the predetermined first physical characteristic is one of gob weight, gob length and gob shape.

One method includes determining, with a prioritized optimizer of the controller, the set of feeder control settings using the predetermined first physical characteristic values of the set of gobs as an input to the prioritized optimizer; measuring actual measured first physical characteristic values for the set of gobs formed using the set of feeder control settings generated by the prioritized optimizer; comparing the measured first physical characteristic values with the predetermined first physical characteristic values to determine first physical characteristic value errors; and adjusting, based on the first physical characteristic value errors, the predetermined first physical characteristic values used by the prioritized optimizer to determine a subsequent set of feeder control settings for forming a subsequent set of gobs.

One method includes determining, with a prioritized optimizer of the controller, the set of feeder control settings using the predetermined first physical characteristic values of the set of gobs as an input to the prioritized optimizer; determining, with a feeder model of the controller, predicted first physical characteristic values for the set of actual gobs formed using the set of feeder control settings determined by the prioritized optimizer; measuring actual measured first physical characteristic values for the set of gobs formed using the set of feeder control settings generated by the prioritized optimizer; comparing the measured first physical characteristic values with the predicted first physical characteristic values to determine first physical characteristic value errors; and adjusting, based on the first physical characteristic value errors, the predetermined first physical characteristic values used by the prioritized optimizer to determine a subsequent set of feeder control settings for forming a subsequent set of gobs.

BRIEF DESCRIPTION OF THE DRAWINGS

These and other advantages of the present invention are best understood with reference to the drawings, in which.

DETAILED DESCRIPTION OF THE INVENTION

Figure 1:
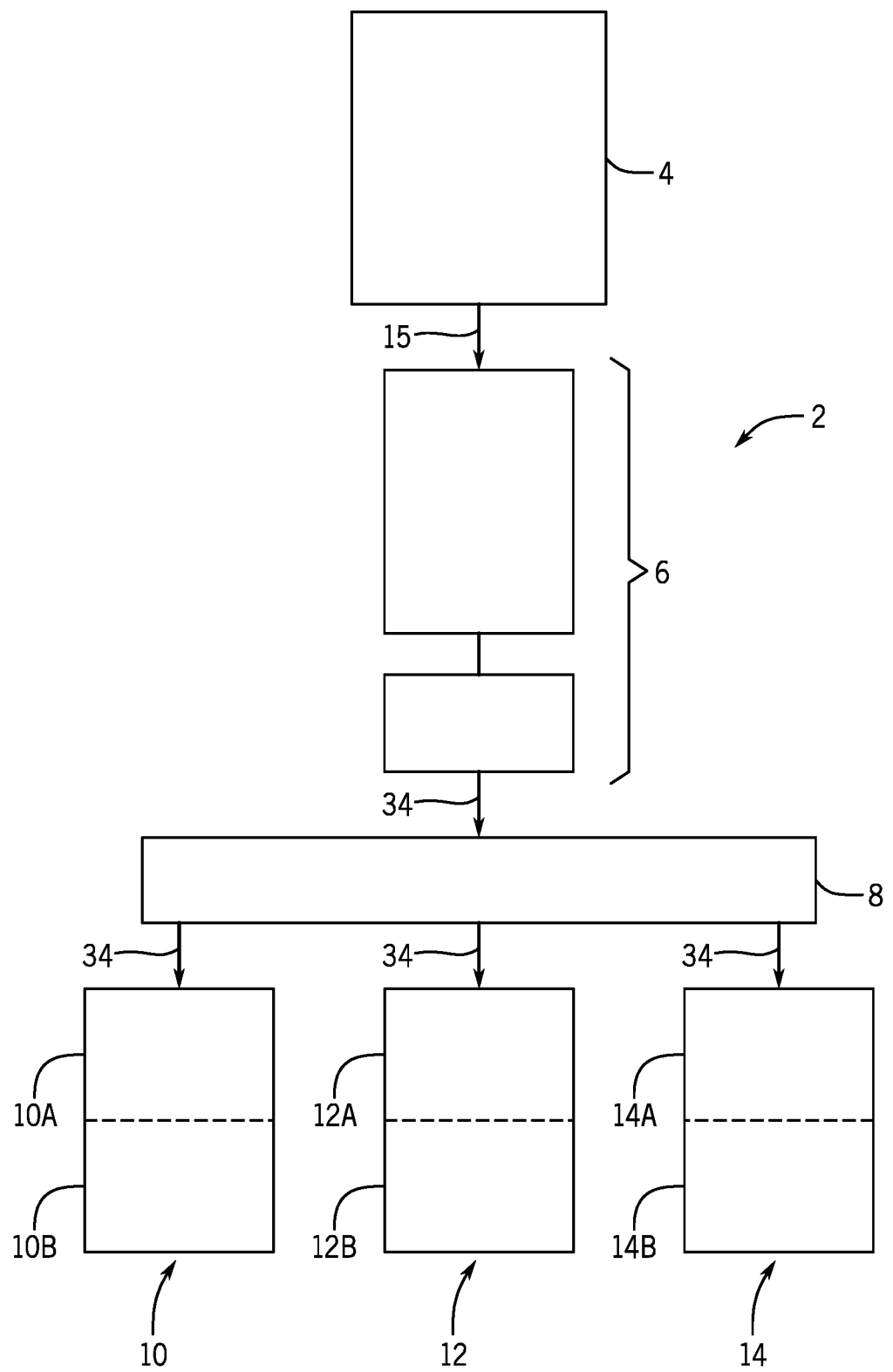
FIG. 1 is a schematic drawing illustrating an individual section machine.

FIG. 1 is a schematic illustration of an individual section machine 2 for forming glass containers. The individual section machine 2 (also referred to herein as "machine 2") has a molten glass supply 4, a gob forming system 6, a gob distribution arrangement 8, and plurality of individual sections 10, 12, 14. While three individual sections 10, 12, 14 are illustrated, the machine 2 could have more or fewer individual sections. Each individual section can have one or more blank molds 10A, 12A, 14A and one or more blow molds 10B, 12B, 14B.

The gob forming system 6 will cyclically convert the molten glass 15 supplied by the molten glass supply 4 into gobs 34 that are distributed to the various individual sections by a gob distribution arrangement 8. For example, gobs 34 may be distributed in sequence to individual section 10, then to section 12 and then to section 14. This will then be repeated until all desired containers are formed. It is noted that the gobs 34 need not be distributed in numerical order, e.g. section 10, section 12 and finally to section 14 but other sequences could be used depending on the variations, if any, between the different gobs 34 that need to be formed to meet the requirements of the containers being formed by the sections 10, 12, 14. For example, different containers could be formed in section 10 as compared to section 12.

In some embodiments, the gob forming system 6 will form gobs 34 having different characteristic values for different ones of the individual sections 10, 12, 14. For instance, the gobs 34 sent to individual section 10 could have a different gob weight, gob length, gob shape, or any combination thereof as compared to the gobs 34 sent to the other individual sections 12 and 14. This will assist a single individual section machine 2 to form a plurality of containers having different characteristics during a single machine cycle, which will be considered to be simultaneous herein. It should be noted that the gobs 34 are sent sequentially to the individual sections 10, 12, 14 (in no particular order as noted above) such that the containers in the various individual sections are not actually formed at the same time. In such a situation, the machine 2 may be continuously cyclically forming a mixture of containers having different characteristics. As such, while each section 10, 12, 14 will cyclically form containers having substantially the same characteristics, the machine 2 may be forming containers having different physical characteristics in the different sections 10, 12, 14. As such, during each machine cycle for machine 2, containers having different characteristics may be made and thus gobs 34 having different characteristics may need to be produced during each machine cycle of machine 2. The gobs 34 produced for a full machine cycle of machine 2 (i.e. the gobs for all of sections 10, 12 and 14) may be referred to herein as a set of gobs.

This is different than if the machine 2 were configured to form a first plurality of containers that all have the same physical characteristics for each machine cycle. Then, after a sufficient number of the first plurality of containers is formed after a desired number of machine cycles, a job change is performed and the machine 2 is switched to form a second plurality of containers that all have the same physical characteristics for each machine cycle but that have at least one physical characteristic that is different than the first set of containers.

This ability to form different containers with gobs having different physical characteristics can provide numerous benefits. Such benefits include reduced mold inventory, greater production planning flexibility and longer run time (with reduced lost time for startup) for smaller production runs. More particularly, this ability prevents the need to create, for the illustrated embodiment, three identical sets of molds for each type of container to be manufactured. Instead, if the manufacture needs to form, for example, three different containers, the manufacture can create one set of molds for each container and form all of the containers for each type with that single set of molds rather than having to create three sets of molds for a single container type to run the machine 2 at full capacity. This can significantly reduce the cost of creating molds. Here the manufacture would only need to form three sets of molds (one for each container type) rather than nine sets of molds (three for each container type) while still being able to run the machine 2 at full capacity.

It is often desired to control and maintain the consistency of the physical characteristics of the gob 34 prior to dispensing the gobs 34 into the individual sections 10, 12, 14 both when forming a plurality of the same containers in all sections as well as when individual sections 10, 12, 14 are used to form containers having different characteristics. However, the ability to adjust the physical characteristics of the gobs 34, such as the weight, length and/or shape of the gobs 34 can be very useful when forming glass containers of different types at the same time as different shaped or sized bottles may be best produced using gobs 34 of different physical characteristics.

Embodiments of the gob forming system 6 are configured to allow for controlling the physical characteristics (also referred to herein as physical characteristic values) of the gobs 34 in both situations identified above as well as to allow for forming gobs 34 having different predetermined physical characteristics.

Figure 2:
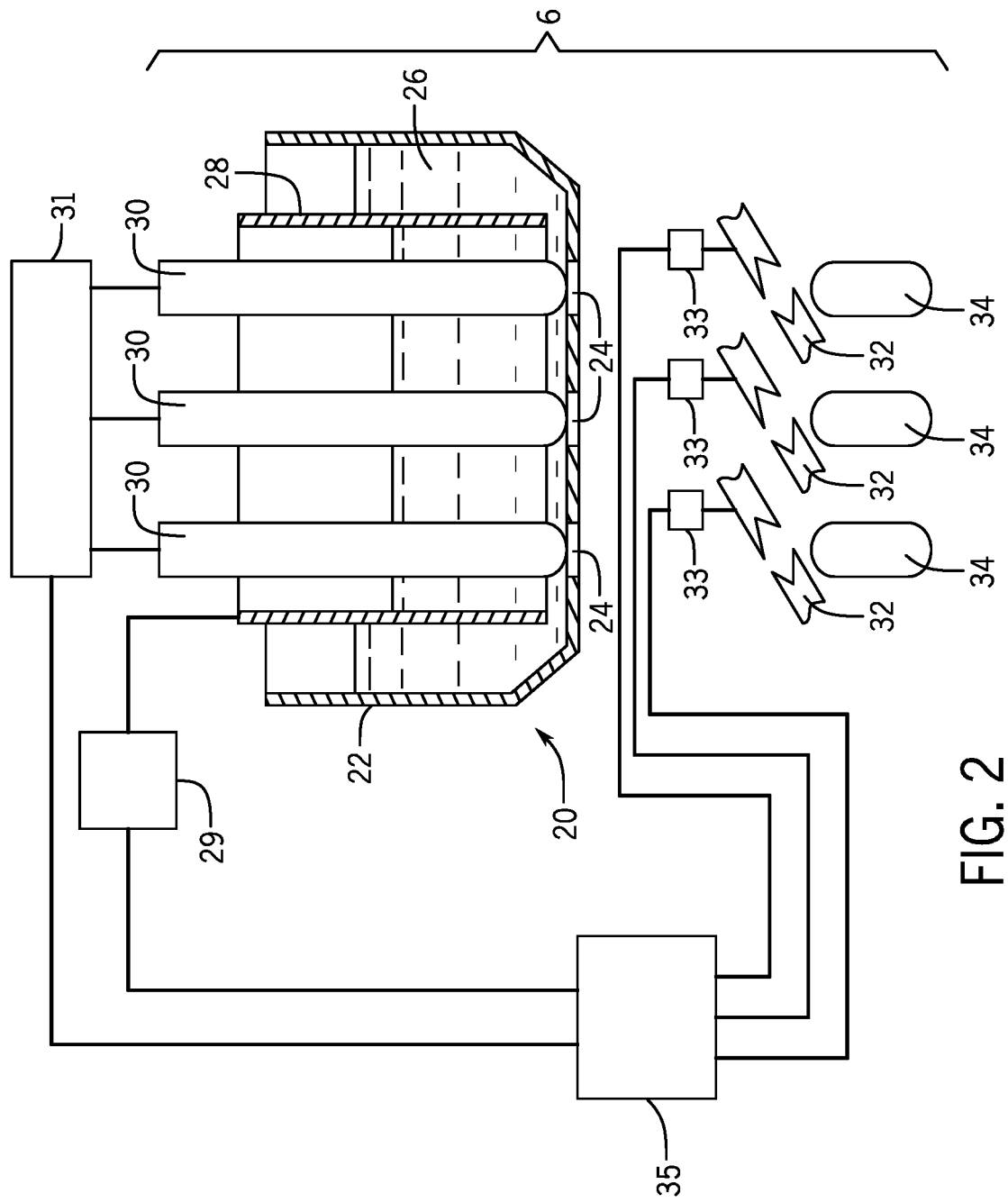
FIG. 2 is a schematic drawing illustrating a three gob feeder shown in a side cutaway view and three sets of shearing blades shown in isometric fashion to better illustrate them.

FIG. 2 schematically shows a gob forming system 6 (also referred to as a system for producing gobs) as used in machine 2. The gob forming system 6 includes a gob feeder apparatus in the form of triple gob feeder 20. As shown, the triple gob feeder 20 has a refractory spout bowl 22 having three vertical discharge orifice holes 24 located in the bottom thereof. Molten glass 26, from the molten glass supply 4 of FIG. 1, is contained in the spout bowl 22, and a cylindrical feeder tube 28 is lowered into the spout bowl 22 and particularly into the molten glass 26 in the spout bowl 22 toward the discharge orifice holes 24. The cylindrical feeder tube 28 is actuatable by a cylindrical feeder tube vertical adjustment arrangement 29 within the cylindrical feeder tube 28 to adjust a position (or offset) of the cylindrical feeder tube relative to the bottom of the spout bowl. This adjustment can adjust the flow of molten glass into the cylindrical feeder tube 28.

Three plunger needles 30 are located within the feeder tube 28 and respectively above the three discharge orifice holes 24, and are reciprocated downwardly and upwardly through the feeder tube 28 by a drive arrangement 31 (e.g. an actuator) to respectively advance and retract the plunger needles 30 toward and away from the discharge orifice holes 24. This action selectively advances the molten glass 26 through the orifices 24 in the form of molten glass streams.

It is noted that in the schematic embodiment, drive arrangement 31 simultaneously drives all three plunger needles 30 at the same time in the same direction (i.e the motion of the three plunger needles 30 is the same and not independent of one another). However, in other embodiments, the drive arrangement 31 could be provided within individual actuators and necessary linkages, if any, for each plunger needle 30 such that each plunger needle 30 could be independently controlled.

The drive arrangement 31 typically includes a motor, and particularly a servo motor, and any necessary linkage necessary to operably couple the motor and the plunger needles 30 to reciprocally drive the plunger needles 30. The motion profile of the servo motor generates a motion profile for the plunger needles 30 which is referred to as a cam. The cam may either be referred to as the motion profile of the drive motor or the plunger needles 30. The cam is defined by the inputs (typically electronic signals) that control the operation of the servo motor. This cam could be referred to as an electronic cam. As such, adjusting the cam can adjust the motion of the drive arrangement 31, e.g. adjusting operation of the servo motor, and thus the reciprocating motion of the plunger needles 30. By using servo motors, it is possible to have a plurality of predetermined cams (e.g. predetermined electronic instructions/inputs/signals to provide predetermined motion profiles for the servo motor) that a user can easily select as starting points for the reciprocating motion profile of the plunger needles 30. Further, the cams can be easily adjusted by simply changing the inputs (electronic signals) to the servo motor.

Because it is reciprocal motion, each cycle of the plunger needles 30 can be correlated to 360 degrees, which would simulate prior rotating mechanical cams used to convert rotational motion into linear motion.

A gob shearing mechanism in the form of three reciprocating pairs of parallel shear blades 32 are located below the spout bowl 22, and have opposed engageable cutting edges that are respectively located below the discharge orifice holes 24. When the shear blades 32 are reciprocated, by corresponding drive arrangements 33 (e.g. actuators), they act to cut the molten glass streams emitted from the discharge orifice holes 24 into hot glass gobs 34. It is noted that in some embodiments, a single set of shear blades may be provided that cuts all three of the hot glass gobs 34. Also, sets of shear blades may not be necessary and only a single blade may be needed. Further, in some embodiments, individual sets of shear blades could be aligned with a corresponding one of the discharge orifice holes 24 and can be controlled independent of the other sets of shear blades.

A control arrangement including controller 35 operably controls the cylindrical feeder tube vertical adjustment arrangement 29, drive arrangement 31 and drive arrangement 33 for controlling the motion of the corresponding components. While a single controller 35 is illustrated schematically, the controller 35 could be provided by a plurality of individual controllers that are driven by a master controller or could be part of a master controller that controls other operations of machine 2 (such as operation of the glass supply and blow and blank side molds). As used herein, a controller shall be considered to encompass any of these arrangements. The controller 35 could include or be provided by a programmable logic controller.

The controller 35 controls the cylindrical feeder tube vertical adjustment arrangement 29, the drive arrangement 31 and drive arrangement 33 based on a set of feeder control settings to control operation of the triple gob feeder 20 and the shear blades 32. The set of feeder control settings will, in part, determine the reciprocal motion pattern for the plunger needles 30 for each gob in the set of gobs (e.g. cam), which may include the plunger height, plunger stroke, and shape of the motion profile (e.g. when the plunger motion begins or stops moving toward or away from the orifices 24), the shearing time or actuation of the shear blades 32, as well as actuation of the cylindrical feeder tube vertical adjustment arrangement 29 to adjust the gob weight, length, and/or shape of the gob(s) that will be formed. It shall be understood that a motion profile for the plunger needles 30 for an entire cycle of machine 2 (e.g. to form all of the gobs 34 within a machine cycle) may be considered to be formed from a plurality of motion profile portions. Each motion profile portion would be the part of the entire motion profile that is used to form a particular gob (or gobs when each section forms multiple containers at one time) within the machine cycle.

Figure 3:
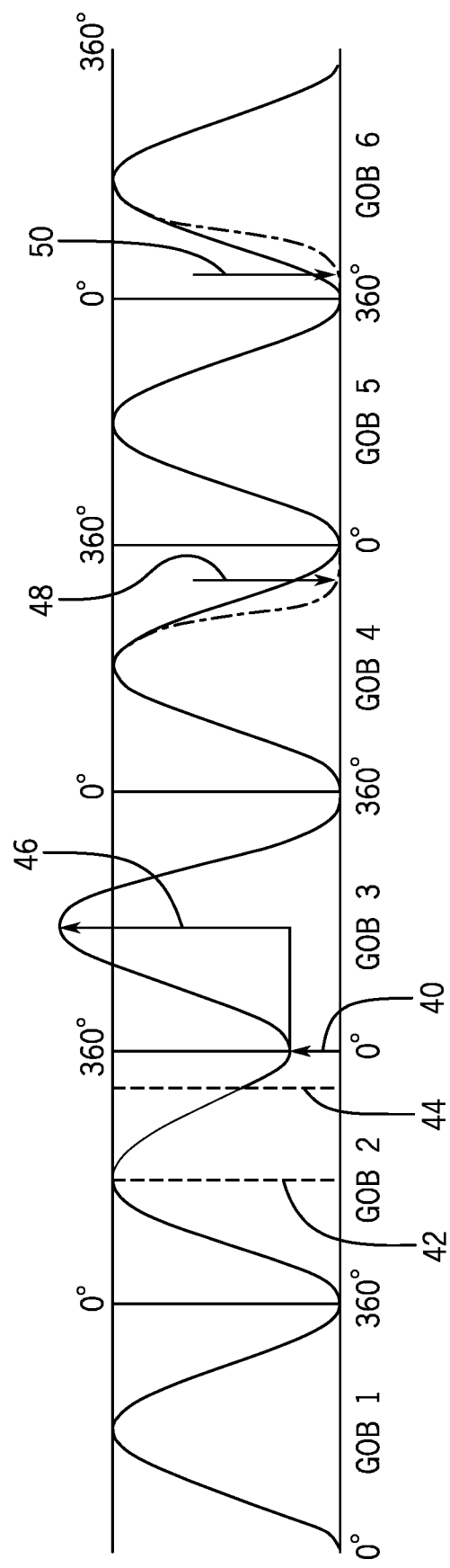
FIG. 3 is a diagram illustrating a movement profile of a plunger needle, showing a number of control parameters used to adjust the motion of the plunger needle.

With reference to FIG. 3, a simplified motion profile (e.g. cam) of the plunger needles 30 is shown over six cycles, with each cycle shown beginning at a reference angle of zero degrees and ending at 360 degrees. These six cycles could be used, for example, in a hypothetical machine 2 that has six sections with each motion profile portion used to form the gobs for an individual one of the six sections.

The motion profile of the plunger needles 30 is a fundamentally sinusoidal operation as displayed in FIG. 3. However other non-sinusoidal operations are contemplated. This motion profile is simply for illustrative purposes and explanation of the various components of the motion profile.

The first cycle, which may also be referred to as a motion profile portion, (moving from left to right in FIG. 3) may be thought of as a baseline cycle, beginning with the plunger needle 30 at its downmost position at zero degrees (at the lower horizontal line which corresponds to the bottom of the plunger needle 30 being closest to its adjacent corresponding discharge orifice hole 24 in the spout bowl 22 of the triple gob feeder 20 (all shown in FIG. 2). The plunger needle 30 is driven through a standard stroke by the drive arrangement 31, which by definition moves the bottom of the plunger needle 30 from the lower horizontal line to the top horizontal line in FIG. 3 (at 180 degrees in the cycle), which stroke does not vary in height, and which is defined by the cam. The first cycle continues with a downstroke from 180 degrees to 360 degrees of the cycle, at which time an extent of molten glass is dispensed from the gob feeder 20. This ends the first cycle shown in FIG. 3, and the dispensed molten glass is used to form Gob 1 provided that Gob 1 is cut with zero shear differential. Shear differential is discussed in more detail below.

The drive arrangement 31 is configured to adjust the heights of the plunger needles 30 relative to the bottom of the spout bowl 22. Height adjustments may be in absolute terms relative to the bottom of the spout bowl 22 or in incremental changes from a baseline distance relative to the bottom of the spout bowl, e.g. a predetermined minimum offset distance from the bottom of the spout bowl. In some embodiments, where the plunger needles are not independently controlled, plunger height and plunger height adjustments are the same for all of the plunger needles 30. However, mechanical adjustments can be performed to adjust the relative positions of the plunger needles 30 that are driven together.

In some embodiments, the plunger needles 30 can be independently driven. In this situation, the individual heights of the plunger needles 30 can be adjusted independently. Adjusting needle height can then compensate for the different locations of each plunger needle in the gob feeder so that identical gobs will be produced by each gob needle in any given cycle. This is due to differences in the flow of molten glass within the gob feeder to the location of each plunger needle 30.

The second and third cycles shown in FIG. 3 differ from the first cycle in that the second cycle ends, and the third cycle begins, with a plunger needle height adjustment indicated by the reference numeral 40. This plunger needle height adjustment 40 is performed between a correction start angle 42 (which occurs at 180 degrees in the second cycle) and a correction end angle 44 (which occurs significantly before 360 degrees in the second cycle), and which is characterized by slowed movement of the plunger needle 30 at the portion of the curve between about 210 degrees and 330 degrees relative to the bottom of the spout bowl 22. It is noted that these numerical values are merely used for example and may be different in other implementations. This results in the second cycle ending with the plunger needle 30 at a height above the bottom horizontal line a distance equal to the plunger needle height adjustment 40, and results in a smaller and lighter Gob 2 being produced in the second cycle due to the reduced length of travel relative to and towards the bottom of the spout bowl 22, (as compared to the nominal first cycle). This can be accomplished by adjusting the electronic cam of the drive arrangement 31 to adjust the distance of travel back towards the bottom of the spout bowl 22 or physically adjusting the position of the drive arrangement 31 relative to the bottom of the spout bowl 22 while maintaining stroke the same or a combination of both.

While the third cycle begins with the plunger needle 30 being located at a height above the bottom horizontal line a distance equal to the plunger needle height adjustment 40, the plunger needle 30 will be raised by a height equal to the standard stroke (indicated by the reference numeral 46) by the drive mechanism 31 (by definition the distance from the lower horizontal line to the top horizontal line in FIG. 3) at 180 degrees in the cycle. Further, since the third cycle ends at the normal point on the bottom horizontal line at 360 degrees, the length of the downstroke will be equal to the height of the normal stroke plus the plunger needle height adjustment 40. Again, this may simply be done by adjusting the cam of the drive arrangement 31 or by physically adjusting the position of the drive arrangement 31 relative to the bottom of the spout bowl 22, while maintaining the stroke provided by the cam of the drive arrangement 31 equal to that of the standard stroke or a combination of both. Due to the extend length of travel relative to and towards the bottom of the spout bowl, a Gob 3 produced by the third cycle will be heavier and longer (as compared to the gob produced by the nominal first cycle).

The fourth cycle (Gob 4) differs from the nominal first cycle in that it has an early cycle end at a point which is indicated by the reference numeral 48 and the dash-dot line. The movement of the plunger needle 30 is characterized by a more rapid downstroke at the portion of the curve between 180 degrees and approximately 330 degrees, at which point the curve is at the lower horizontal line and is the point at which the plunger needle 30 stops moving towards orifices 24 and the bottom of spout bowl 22. This results in the fourth cycle producing a lighter and shorter Gob 4, but one which is very nearly nominal as in the first cycle.

The fifth cycle is nominal and produces a Gob 5 which is nominal, like the first cycle.

The sixth cycle has a cycle start delay 50 at a point which is indicated by the reference numeral the cycle start delay 50 and is illustrated by a dash-dot line. The stroke of the plunger needle 30 from this point to 180 degrees in the cycle is characterized by a more rapid stroke of the curve, at which point the curve is at the upper horizontal line. The sixth cycle ends with a normal downstroke reaching the bottom horizontal line at 360 degrees, and Gob 6 produced by the sixth cycle will be lighter and shorter than nominal.

Figure 4:
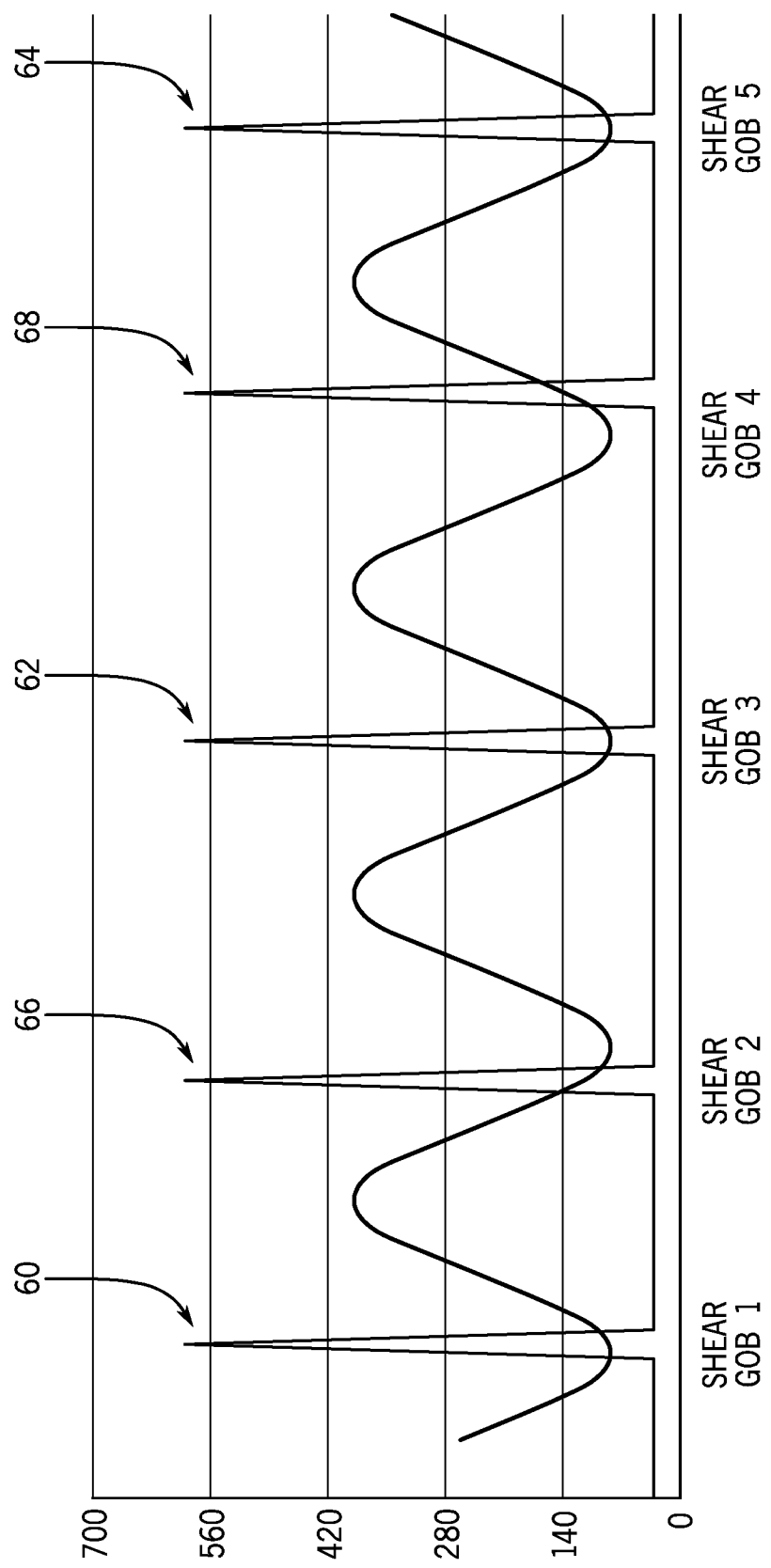
FIG. 4 is a diagram illustrating several optional shearing control parameter shear differentials.

Referring next to FIG. 4, another optional control parameter, shear differential, is illustrated. Shear differential defines the shear cutting time in the plunger cycle and may be represented by degrees. Normally, consecutive shear periods are 360 degrees apart. When shear differential is zero, the shear cuts the molten glass flow from the gob feeder when the bottom of the plunger needle reaches its lowest point (nominally at 360 degrees as shown in each of the cycles illustrated in FIG. 3). In FIG. 4, the shearing of five consecutive gobs is illustrated, with Gob 1, Gob 3, and Gob 5 being sheared at the points respectively indicated by their reference numerals 60, 62, and 64 (their nominal times, i.e., when the bottom of the plunger needle reaches its lowest point, or 360 degrees). Thus, it will be understood that for the shearing of Gob 1, Gob 3, and Gob 5, the shear differential is zero.

With a negative shear differential, the shear blades will be operated earlier by a given angle and thus will cut the molten glass stream into a hot glass gob earlier. The shearing of Gob 2 is performed with a negative shear differential, as indicated by the reference numeral 66. Gob 2 will be lighter, and the next gob (Gob 3) will be heavier. In general, the weight lost on the target gob (Gob 2) is nearly equal to the weight gain on the next gob (Gob 3). With a positive shear differential, the shear blades will be delayed and will cut the molten glass stream into a hot glass gob later. Gob 4, being sheared with a positive shear differential, will be heavier, and the next gob (Gob 5), being sheared with zero shear differential, will be lighter. In general, the weight gained on the target gob (Gob 4) is nearly equal to the weight loss on the next gob (Gob 5).

It will be appreciated that the key feeder control settings used by the controller 35 to control the motion of the plunger needles 30 include the plunger needle height adjustment 40, the correction start angle 42, the correction end angle 44, the height of the standard stroke 46, the early cycle end 48, the cycle start delay 50. Additionally, a further feeder control setting used by the controller is the shear differential as to when the gob is actually sheared from the stream of molten glass can. These feeder control settings can all be adjusted by the controller 35 on an individual gob cut basis to adjust the physical characteristics of individual gobs 34 including weight, length and shape.

Typically, the controller 35 will adjust tube height the same for all gobs 34 and will not adjust the tube height on an individual gob cut basis. Tube height may be adjusted to provide for adjustments in overall glass throughput, e.g. combined weight produced by all of the sections within machine 2.

Typically, an adjustment of any one feeder control setting corresponding to a particular (target) gob will influence the weight, length, and shape of the target gob. The effect of the feeder control settings has been found to be highly coupled. The feeder control adjustments affect the adjacent (in cutting order) gob formation as well. Some adjustments have different influences on each orifice in a multi-orifice spout bowl such as the one illustrated in FIG. 3 (corresponding to for example to the inner, middle, and outer cavity for a triple gob machine). These considerations can be used in determining a priority order as discussed below.

In general, each feeder control setting has been found by the inventors to have some dominant effect on one gob characteristic. For example, the plunger stroke has been found by the inventors to have more effect on the gob length than on the gob weight. Although the feeder control settings have been found by the inventors to mainly affect the target gob. They have less, but non-negligible, influence on adjacent gobs. This coupling to adjacent gobs makes it extremely complex and difficult to set up the feeder control settings correctly to generate the most desirable gob weight, length, and shape for each individual section's cavities, particularly for a multi-container production (e.g. different types of containers that require gobs with different physical characteristics) on one I.S. machine line.

In embodiments of this invention, mathematical models are developed to correlate the feeder control settings effect on gob weight, length, and shape forming. By using the model based system outlined herein, the operator need only specify desired physical characteristic values for the set of gobs 34 formed in a complete machine cycle. The controller 35 then determines the required set of feeder control settings for the machine cycle to control the components of the gob forming system 6 to closely achieve formation of a set of gobs 34 for the machine cycle at the desired physical characteristic values.

In a multi-gob machine in which multiple gobs are formed and supplied to a single section simultaneously, e.g. a triple gob machine as illustrated above, the desired physical characteristic values for a particular section may be selected by setting the desired physical characteristic value for a single one of the plurality of gobs and, for example could correspond to a selected one of the cavities, e.g. inner, outer or middle, or alternatively could be the average of all of the desired physical characteristic values for all gobs produced for the section at each shear cut.

In general, more than one combination of feeder control settings can be used to obtain gobs 34 with the desired physical characteristics for the machine cycle. However, it may be more desirable to adjust some feeder control settings than others. For example, deviations for some feeder control settings may more adversely affect gob shape or uniformity between a group of gobs formed for a single section in a multi-gob feeder such as illustrated, e.g. uniformity between the inner, outer and middle gobs.

In order to solve for the feeder control settings for the feeder that will obtain the desired output gob weights, lengths and shapes a mathematical model must be formulated that relates the feeder process inputs to the feeder process outputs.

Typically, these mathematical models will be specific to each individual gob forming system. Model parameters, such as sensitivity coefficients, can be determined empirically by intentionally perturbing selected feeder control settings and measuring the response. Alternatively, this could be done by perturbing selected feeder control settings in a high fidelity simulation model. However, this method can take significant computing time. The controller 35 will use mathematical models to determine the set of feeder control settings for forming the set of gobs 34 for the machine 2. Typically, the set of feeder control settings will be the feeder control settings for forming each of the gobs 34 for one complete machine cycle and then the settings will be repeated for subsequent machine cycles.

Although more complex models could be used, the linear perturbation model given by Equation 1 has been found to provide an adequate approximation of the actual behavior using the control approach detailed here.

$$\begin{bmatrix} W - W_0 \\ L - L_0 \end{bmatrix} = G \begin{bmatrix} P_h - P_{h0} \\ P_s - P_{s0} \\ S - S_0 \\ E - E_0 \\ D - D_0 \\ T - T_0 \end{bmatrix} \quad \text{Equation 1}$$

Where:
W, $W_0$ are vectors of gob weights and nominal gob weights, respectively;
L, $L_0$ are vectors of gob lengths and nominal gob lengths, respectively;
G is a matrix of sensitivity coefficients;
$P_h$, $P_{h0}$ are vectors of feeder plunger heights and nominal feeder plunger heights, respectively;
$P_s$, $P_{s0}$ are vectors of feeder plunger strokes and nominal feeder plunger strokes, respectively;
S, $S_0$ are vectors of feeder plunger start delay and nominal feeder plunger start delay, respectively;
E, $E_0$ are vectors of feeder plunger early end and nominal feeder plunger early end, respectively;
D, $D_0$ are vectors of shear differentials and nominal shear differentials, respectively;
T, $T_0$ is the feeder tube height and nominal feeder tube height, respectively;

Typically, each vector will include one component for each section. Thus in a three section system, such as illustrated in FIG. 2, each vector would include three values.

The model given by Equation (1) can be expressed more compactly by Equation (2):

$$y = Gu \quad \text{Equation 2}$$

Where:
y is the overall output vector of weight and length deviations from their nominal values;
u is the overall input vector of control settings including, for example, plunger height, plunger stroke, etc. in the form of deviations from nominal values.

In a given instance of the model given by Equation (1), there will be more inputs than outputs. For example, in an eight-section machine, there are sixteen outputs if gob weight and length are only considered (eight gob weights and eight gob lengths), which could be expanded to twenty four outputs if gob shape were also considered, and forty-one inputs in total (eight plunger heights, eight plunger strokes, eight start delays, eight early ends, eight shear differentials, and a single tube height). Again, this is assuming only a single value for each setting for each section when using a multi-gob system. Tube height typically remains the same and is not typically uniquely adjusted for individual gobs/sections (e.g. between Gob 1 and Gob 2 discussed above). Thus, there are forty uniquely determinable feeder control settings. As noted above, adjustment of these uniquely determinable feeder control settings may directly affect adjacent gobs in the forming sequence as well as the target gob. Because there are more adjustable inputs than outputs, this means there will be an infinite number of solutions to obtain the output goal.

In general, it may be more desirable to achieve the desired solution by making adjustments to some feeder control settings before making adjustments (deviations from nominal feeder control settings) to other feeder control settings. Thus, the feeder control settings and corresponding deviations will have a predetermined priority order from lowest priority to highest priority. More particularly, higher priority feeder control settings are desired to be adjusted from nominal values before lower priority feeder control settings.

For example, the effect of plunger height on gob weight may be somewhat different for each orifice hole 24 when a plurality of orifices 24 are present, e.g. in the illustrated multi-gob system, while the effect of start-delay or early-end may be, and typically is, quite similar for each orifice hole 24. In this case when adjusting the feeder control settings to produce gobs with desired weights and lengths, it would be desirable, if possible, to use less plunger height adjustment and more early-end or start-delay adjustment so as to avoid or reduce affecting the gobs formed by adjacent plunger needles 30 and corresponding orifice holes 24. In this case, the plunger height may be considered to be a more "expensive" feeder control input and would thus have the lowest priority and be desired to have as little adjustment as possible. Adjustment of higher priority feeder control settings may be viewed as having a lower expense than adjustment of lower priority feeder control settings and would thus be more desirable to adjust if adjustments are necessary. This allows a prioritized optimization approach to be an effective approach to solve the problem. The prioritized adjustment of the use of the inputs where as little as possible of the most expensive input set (lowest priority) is adjusted, and then the next most expensive input set, and so on.

To be useful, it must be possible to actually calculate the optimal feeder control setting. A general approach for doing this will be given, along with some possible specific practical implementations.

The general approach can be described as follows. We define a set of objective functions, $f_i(u)$ i=1, 2, . . . N, to be minimized. Each $f_i(u)$ provides a scalar value expressing the suitability of a given solution, u where the smaller the value of $f_i(u)$ is the better. These objective functions are ordered so that $f_1(u)$, is considered the lowest priority $f_N(u)$, is the highest priority.

We then perform a sequence of optimizations to find:

$$h_i = \min_u f_i(u) \text{ such that} \quad \text{Equation 3}$$
$$f_k(u) = h_k \text{ for all } k < i \text{ and } u_L \leq u \leq u_U$$

The sequence of optimizations defined by Equation (3) can be interpreted as follows. Starting with the lowest priority objective, $f_1(u)$ we find a solution, it which minimizes this objective with it within the defined lower and upper limits $u_L$ and $u_U$ respectively. We then move on to perform the next optimization, in which we now minimize $f_2(u)$ but with the additional constraint that the previous objective function remains at its minimal value $h_1$. This sequence of optimizations, in which at each stage the objectives from the previous stages become constraints for the current stage, is continued until all of the levels have been completed. The final result is a solution in which each objective is achieved as well as possible, without adversely impacting a higher priority objective. This approach can be seen to be an extension of that presented by (de Lasa & Hertzmann, 2009) which did not include the lower and upper bound constraints on the inputs.

For practical application a method of actually solving Equation (3) is needed. The detailed method of actually solving Equation (3) depends upon the specific choice of the objective functions, $f_i(u)$. Approaches will be detailed here for application to the multi weight feeder, using two different possible choices of objective functions. First, a method will be detailed using L2 norm (sum of squared terms) objective functions. Second, a method will be detailed using the L1 norm (sum of absolute value terms) objective functions. In the first case, the problem is ultimately reduced to solving a number of QP (Quadratic Programs) for which standard software solvers are readily available. In the second case the problem is ultimately reduced to solving a number of LP (Linear Programs) for which standard software solvers are also readily available. The L2 norm provides what is perhaps a more intuitive behavior in its distribution of the control efforts, but requires the use of a QP (Quadratic Programming) routine which is somewhat more difficult to implement than the LP routine used by the L1 norm formulation. As both options are seen as viable, they are both elaborated here.

Solution Using a L2 Norm

It is useful to choose objective functions with the specific form:

$$f(u)_i = \|A_i u - b_i\|_2^2 \qquad \text{Equation 4}$$

Where, each $A_i$ is a matrix, each $b_i$ is a vector, whose specific definitions are provided subsequently. The notation, $\|\cdot\|_2$ indicates the standard Euclidean, or 2 norm of a vector, v, given by:

$$\|v\|_2^2 = v_1^2 + v_2^2 + v_3^2 + \ldots v_n^2 \qquad \text{Equation 5}$$

The vector, u, consists of the feeder control settings put into block matrix form as:

$$u = \begin{bmatrix} u_1 \\ u_2 \\ \vdots \\ u_K \end{bmatrix} \qquad \text{Equation 6}$$

Where each of the $u_i$ are vectors of feeder control settings corresponding to a specific feeder control setting, e.g. plunger-height. The elements of u are ordered from highest to lowest priority. That is, it is preferred to adjust input j rather than input i whenever j>i.

Substituting for the objective function, Equation (4), into the general prioritized optimization problem Equation (3), gives:

$$h_i = \min_u \|A_i u - b_i\|_2^2 \text{ such that} \qquad \text{Equation 7}$$
$$\|A_k u - b_k\|_2^2 = h_k \text{ for all } k < i \text{ and } u_L \leq u \leq u_U$$

The values for the individual matrices $A_i$ and $b_i$ are defined as follows: First $A_1$ and $b_1$ are assigned to form an objective function which ensures that the desired output values are achieved as closely as possible. Specifically, we assign:

$$A_1 = G$$

$$b_1 = y_d \qquad \text{Equation 8}$$

Where $y_d$, is the desired output value, and G is the matrix of sensitivity coefficients defined in Equation (2).

Substituting from Equation (8) into Equation (7) gives $h_1 = \|Gu - y_d\|_2^2$. Comparison with Equation (3) reveals that minimizing $f_1$ can be interpreted as minimizing the difference between the model's predicted output and the desired values. In particular, $h_1 = 0$ implies that the desired values are achieved exactly.

The remaining $A_i$ and $b_i$ are assigned to minimize the use of the $(i-1)^{th}$ input parameter, specifically we assign:

$$A_i = [0 \ 0 \ \ldots \ I \ \ldots \ 0]$$

$$b_i = 0 \qquad \text{Equation 9}$$

Where the zero and identity matrices, 0 and I are appropriately dimensioned so that when $A_i$ is multiplied by u the result is $A_i u = u_{i-1}$, and substituting for $A_i$ and $b_i$ from Equation (11) into Equation (6) gives $f_i = \|u_{i-1}\|$, so that minimizing the ith objective acts to minimize the use of the $(i-1)^{th}$ input parameter.

Solution Method for the L2 Formulation.

Collecting together equations, and substituting into Equation (7), we must solve the sequence of optimizations for i=1 to n, given by:

$$h_i = \min_u \|A_i u - b_i\|_2^2 \text{ such that} \qquad \text{Equation 10}$$
$$\|A_k u - b_k\|_2^2 = h_k \text{ for all } k < i \text{ and } u_L \leq u \leq u_U$$

With:

$$A_1 = G \qquad \text{Equation 11}$$
$$A_i = [0 \ 0 \ \ldots \ I \ \ldots \ 0], \text{ for } i > 1 \text{ And,}$$
$$b_1 = y_d \ b_i = 0, \text{ for } i > 1$$

At each stage in the sequence of optimizations, defined by Equation (10) an optimization is specified involving a quadratic objective function, and quadratic constraints. This is known as a QCQP (quadratically constrained, quadratic program). While specialized numerical techniques exist for solving this class of problems, it is not a problem which is solved by readily available libraries of numerical programming functions. Instead, we will transform the original problem, to a simpler problem, involving a quadratic objective function and linear constraints, which is classified as QP (quadratic programming) problem. Reliable, solvers for this type of problem are readily available. Essentially the quadratic constraints are avoided by parameterizing the solutions at each stage in such a way that we are only searching over a subspace in which all of the constraints from the prior stages are satisfied. Specifically, extending the approach used by (de Lasa & Hertzmann, 2009) to include the limit constraints, the recursive algorithm shown in FIG. 5 has been developed by the inventors to solve this problem.

Solution Using L1-Norm Minimization

It is also possible to utilize an alternative formulation in which we choose objective functions with the specific form:

$$f(u)_i = \|A_i u - b_i\|_1 \qquad \text{Equation 12}$$

Where, $A_i$ is a matrix, $b_i$ is a vector and $\|\cdot\|_1$ indicates the L1-norm of a vector, $v = A_i x - b_i$ given by:

$$\|v\|^2 = |v_1| + |v_2| + |v_3| + \ldots |v_d| \qquad \text{Equation 13}$$

This formulation requires solution of a LP (linear programming problem) rather than a QP (Quadratic program). Since LP solution algorithms, such as the Simplex algorithm, are very widely available in collections of numerical methods and are also relatively straightforward to implement, this may potentially be beneficial in terms of the ease of software development. The solutions obtained using the L1-norm may be different than that obtained using the L2-norm, as they are each based on a somewhat different definition of what is "best." Both possibilities are options, and whether for software implementation, or process control reasons, one or the other may be chosen.

Solution Algorithm Using L1-Norm

Defining $A_i$ and $b_i$ as above and collecting together we must solve the sequence of optimizations for i=1 to n, given by:

$$h_i = \min_u \|A_i u - b_i\|_1 \text{ such that} \quad \quad \text{Equation 14}$$
$$\|A_k u - b_k\|_1 = h_k \text{ for all } k < i \text{ and } u_L \le u \le u_U$$

Figure 6:
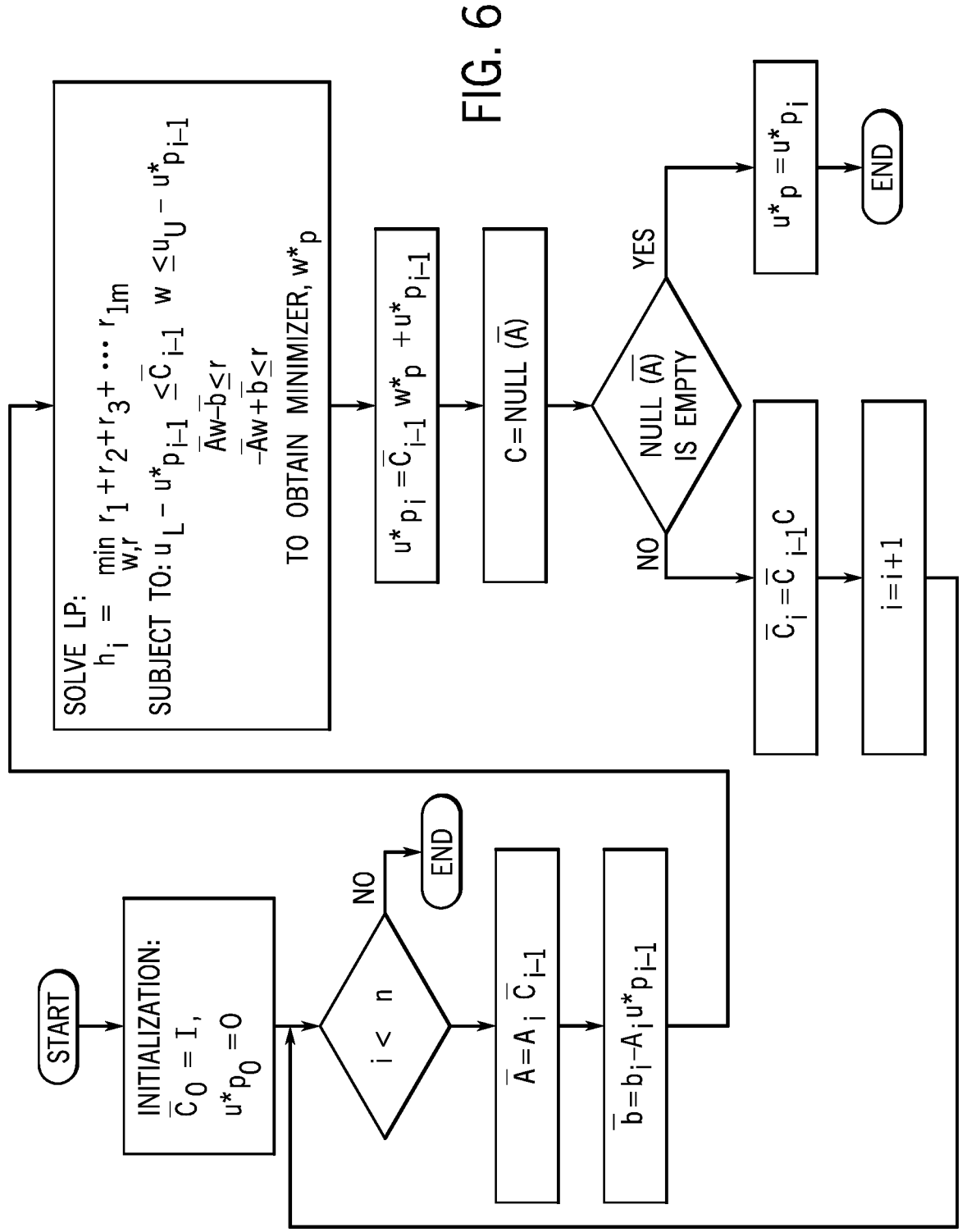
FIG. 6 is a flow chart for determining feeder control settings using L1-norm objective functions.

With:

$A_1 = G$
$A_i = [\,0 \quad 0 \quad \ldots \quad I \quad \ldots \quad 0\,]$, for $i > 1$ And,
$b_1 = y_d$, $b_i = 0$, for $i > 1$ Extending the approach used by (de Lasa & Hertzmann, 2009) to include the limit constraints and adapting to use the L1-norm, the recursive algorithm shown in FIG. 6 has been developed by the inventors to solve this problem.

Figure 5:
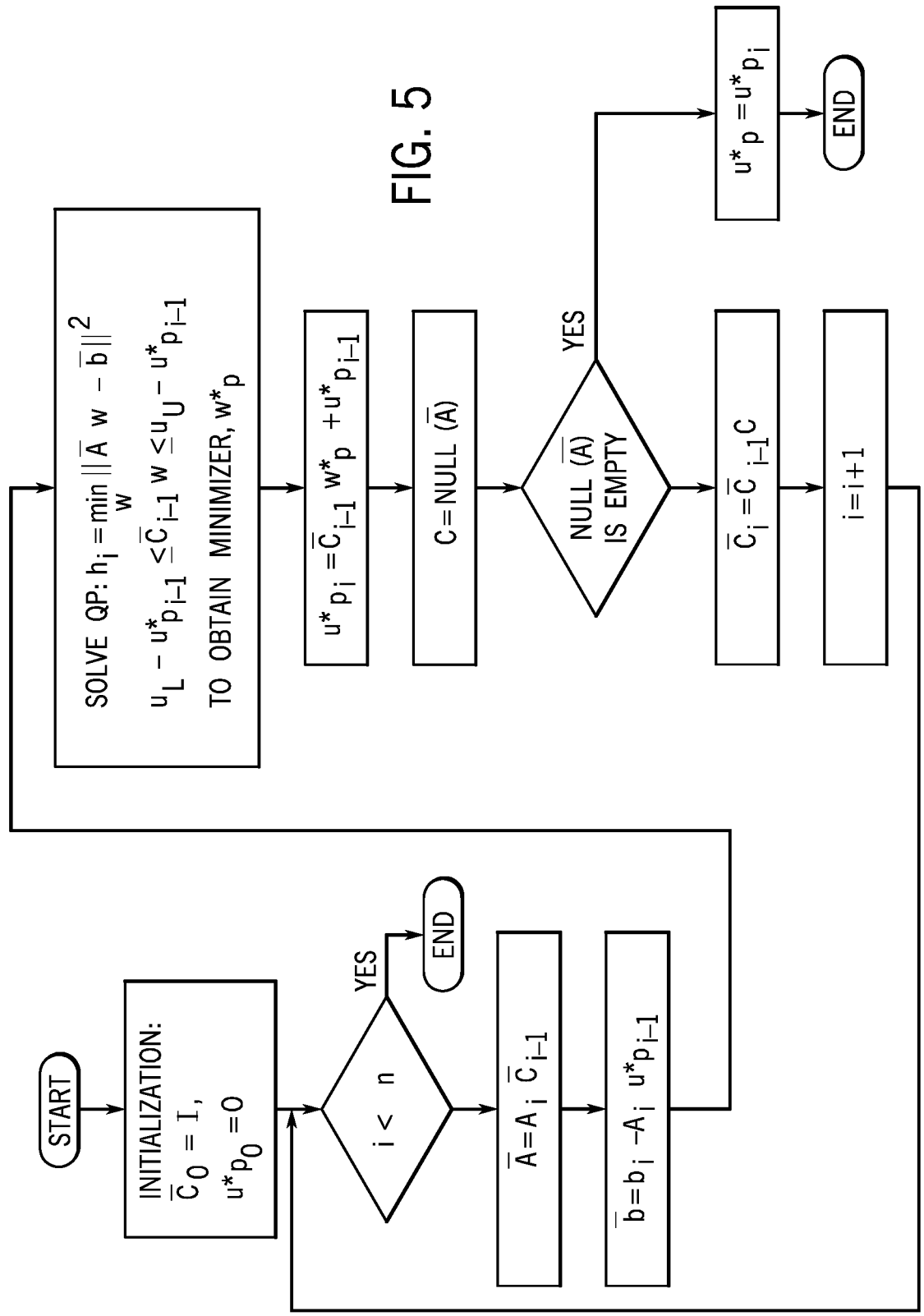
FIG. 5 is a flow chart for determining feeder control settings using L2-norm objective functions.

The controller 35 will execute the steps detailed in either FIG. 5 or FIG. 6 (depending upon the choice of problem formulation), solving for an optimal solution each time a new set of desired setpoint values (gob weight, gob length, gob shape, etc.) are entered, or the input parameters (limit values, calibration coefficients) have changed.

Typically, the resulting set of values is a set of feeder control setting deviations from a set of predetermined nominal feeder control settings.

The set of feeder control setting deviations is feasible if the set of feeder control settings that is developed using the determined set of feeder control setting deviations will create a set of gobs with each gob having the desired (e.g. predetermined) physical characteristic values, e.g. weight, length and/or shape. The set of feeder control setting deviations is optimal if a magnitude of any one of the feeder control setting deviations within the set of feeder control setting deviations is reduced, a magnitude of a feeder control setting deviation having a lower priority must be increased for the set of feeder control setting deviations to remain feasible. The optimal solution is thus at the lowest expense.

The optimal and feasible set of feeder control setting deviations are deviations from a set of predetermined nominal feeder control settings. Each feeder control setting deviation will be within a predetermined range of deviation from between zero deviation to a maximum deviation from the corresponding predetermined nominal feeder control setting.

The set of predetermined nominal feeder control settings will have a nominal value for each feeder control setting that can be adjusted to determine the set of feeder control settings that will be used to form the gobs having the desired physical characteristics (also referred to as physical characteristic values). The optimal and feasible set of feeder control setting deviations will be combined with the set of predetermined nominal feeder control settings to obtain a set of feeder control settings that will be used to cyclically form the gobs 34 for the various sections 10, 12, 14.

The controller 35 could be preprogrammed with various different sets of predetermined nominal feeder control settings. For example, a baseline set of predetermined nominal feeder control settings could be selected based on an overall characteristics of the gobs to be formed in a machine cycle and then deviations based on the specific user inputs. For example, the average gob weight and/or average length of all gobs in a machine cycle could be used to generate or select a set of predetermined nominal feeder control settings.

This method of determining feeder control settings can be used to determine feeder control settings for forming gobs 34 when different ones of the set of gobs to be formed are desired to have different predetermined physical characteristics. In such a situation, the set of feeder control settings may be considered to have a first subset of feeder control settings that is all of the uniquely determinable feeder control settings for forming one of the gobs 34 (or a set of gobs for a first particular section in a multi-gob system as outlined above) and a second subset of feeder control settings for forming another one of the gobs 34 (or a set of gobs for a second particular section in a multi-gob system as outlined above) wherein at least one of the uniquely determinable feeder control settings of the first subset is different than a corresponding at least one of the uniquely determinable feeder control settings of the second subset.

The mathematical model used needs to be calibrated according to the planned container production. This is done by first setting up the gob weight and length to an approximate reference level by adjusting the feeder tube height, plunger motion and shearing to nominal values. Each feeder control setting is then varied individually and the effect on the target gob and adjacent (in cutting order) gob's weight, length, and shape is recorded. This calibration step is repeated for each feeder control parameter to be used. While indicated as being on a single gob, this could apply to sets of gobs for a particular section in a multi-gob system as outlined above.

Figure 7:
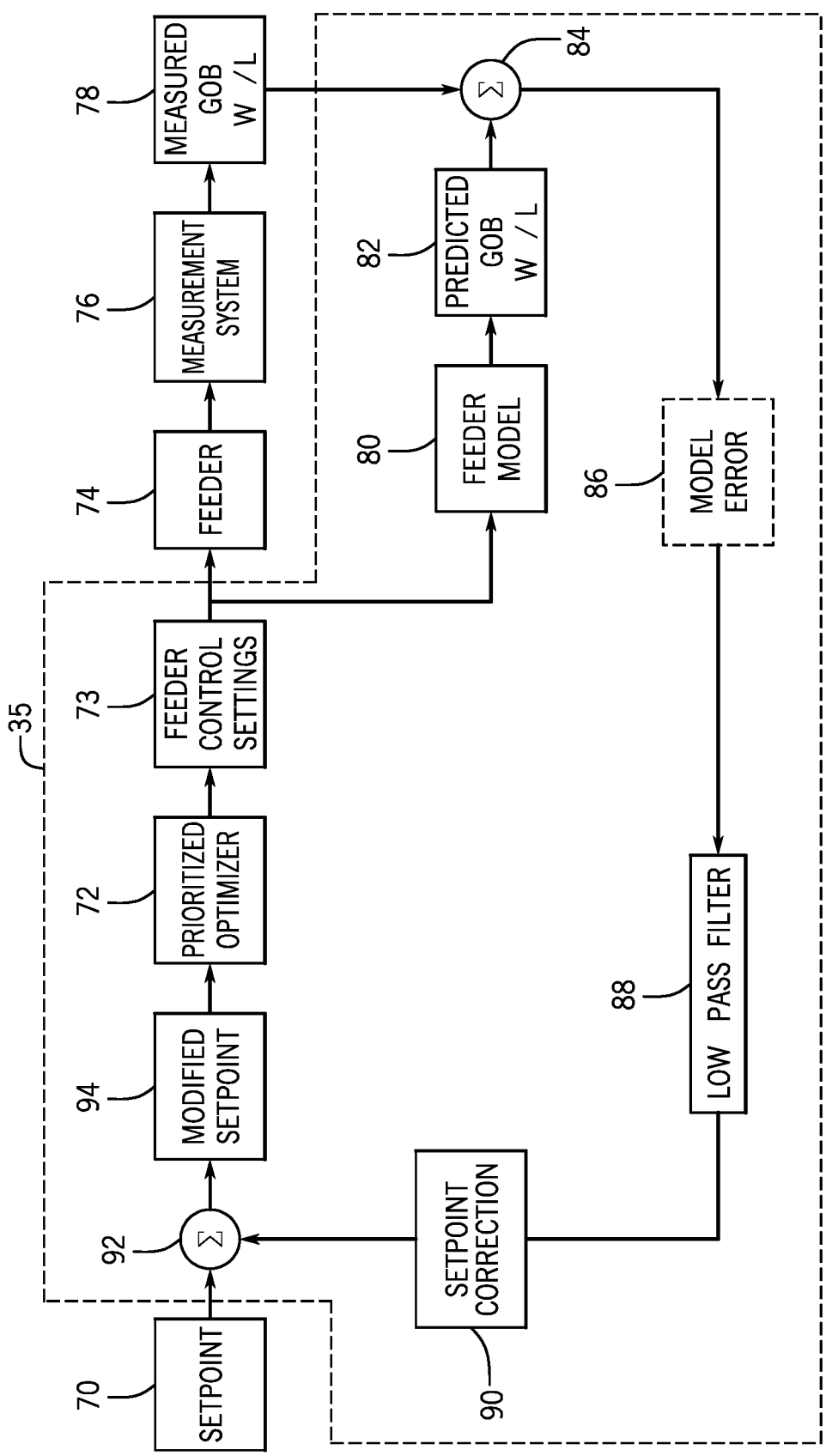
FIG. 7 is schematic depiction of a closed loop gob feeder control system for forming glass gobs having desirable characteristics.

By implementing the mathematical models, the controller 35 can be a closed loop system to generate feeder control settings to achieve the desired gob formation for each individual section and cavity as the user specifies. The model based control system is schematically shown in FIG. 7. In the current implementation, the gob physical characteristics such as gob weight and gob length are the target gob characters to be controlled in the illustrated embodiment. However, gob shape could also be controlled.

The closed loop control shown in FIG. 7 operates as follows. Desired gob physical characteristic values such as weight and length setpoints 70 are input to a prioritized optimizer 72. The prioritized optimizer 72 computes, using the optimization methods outlined above and the user desired physical characteristic values (e.g. gob weight and length in this example), a set of feeder control settings 73 that should approximately achieve the desired gob weight and length (e.g. setpoints 70). The computed feeder control settings 73 are then applied to the actual feeder 74 (e.g. gob forming system 6) to control the feeder plunger motion (e.g. the cam which is defined by the feeder control settings 73 for controlling the drive arrangement 31 and particularly the servo motor, if used), the cylindrical feeder tube vertical adjustment arrangement 29 to control the vertical offset of the feeder tube 28, and drive arrangements 33 to control actuation of the shear blades 32. This results in the actual gobs 34 being formed.

A measurement system 76 then obtains and provides measured values 78 of the desired physical characteristics used to setup the system, e.g. gob weight and length.

In the embodiment in FIG. 7, a feeder model 80 uses the computed feeder control settings 73 to predict gob weight and length values 82. The predicted gob weight and length values 82 are compared with the measured values 78 at summer 84 producing a model error signal 86. If the feeder model 80 and prioritized optimizer 72 of the process are perfect, this signal 86 would be zero. The modeling error 86 is filtered by a low pass filter 88 to avoid high frequency modeling errors and noise to produce setpoint correction factors 90. The setpoint correction factors 90 are applied to modify the setpoints 70 accordingly at summer 92. The modified setpoints 94 are feedback in the control loop to complete the closed loop control. The inclusion of feeder model 80 assists in feedback in a system, like this, where there is multivariable control problems. The overall internal model control structure assists with multivariable control problems and simpler feedback loop tuning.

The results from the feeder model 80 may be different than the setpoints 70 if, for example, the necessary feeder control settings to produce gobs having the physical characteristics defined by setpoints 70 are outside of the operational limits of machine 2 (these limits may be limits on the magnitude of any deviations from the nominal values of the feeder control settings. In such a situation, the feeder control settings 73 are clipped by the prioritized optimizer 72 such that the feeder control settings 73 are within the operational limits of machine 2. However, when these clipped feeder control settings 73 are sent to the feeder model 80, the feeder model 80 will generate predicted gob weight and length values 82 that are different than setpoints 70. This will allow for the system to correct the model and/or feeder control settings.

The control algorithms described above that are employed by controller 35 could be a fully automatic closed loop feeder control such as illustrated in FIG. 7 when the measured gob weight/length feedback/shape is obtained by an automatic gob measurement system, e.g. cameras. It can also function as a semi-automatic feeder control system when the measured gob forming information is provided manually by users.

During production, the user can always recalibrate the model by following some specific calibration steps. For instance, the user can manually change one feeder control setting and measure the changes of targeted and adjacent gobs weight and length change. The recorded results (changed feeder control setting, gob weight/length changes) are then fed into the model calibration database. From then on, the feeder model can use the updated calibration information.

Although the foregoing description of the present invention has been shown and described with reference to particular embodiments and applications thereof, it has been presented for purposes of illustration and description and is not intended to be exhaustive or to limit the invention to the particular embodiments and applications disclosed. It will be apparent to those having ordinary skill in the art that a number of changes, modifications, variations, or alterations to the invention as described herein may be made, none of which depart from the spirit or scope of the present invention. The particular embodiments and applications were chosen and described to provide the best illustration of the principles of the invention and its practical application to thereby enable one of ordinary skill in the art to utilize the invention in various embodiments and with various modifications as are suited to the particular use contemplated. All such changes, modifications, variations, and alterations should therefore be seen as being within the scope of the present invention as determined by the appended claims when interpreted in accordance with the breadth to which they are fairly, legally, and equitably entitled.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be claimed alone or in combination with any of the features, elements, or components of any of the other embodiments discussed above.

What is claimed is:

1. A control arrangement for controlling a system for producing gobs for an individual section machine having a plurality of sections including at least a first section and at least a second section, the system cyclically producing a set of gobs including at least one gob for each of the plurality of sections including at least one first gob for the first individual section and at least one second gob for the second individual section, wherein each gob has a predetermined first physical characteristic value, the system producing gobs including: (1) a gob feeder apparatus and (2) a gob shearing mechanism, the gob feeder apparatus having: (A) a spout bowl with at least one discharge orifice hole located in the bottom thereof; (B) a cylindrical feeder tube within the spout bowl; (C) a cylindrical feeder tube vertical adjustment arrangement for adjusting the vertical offset of the cylindrical tube feeder relative to the bottom of the spout bowl; (D) at least one plunger needle located within the feeder tube above the at least one discharge orifice hole; and (E) a drive arrangement operably coupled to the at least one plunger needle to reciprocally drive the plunger needle toward and away from the discharge orifice hole to emit at least one molten glass stream, the gob shearing mechanism having a reciprocating shear blade located below the spout bowl to repeatedly cut the at least one molten glass stream emitted from the discharge orifice hole to form the gobs that form the set of gobs, the control arrangement comprising:

a controller configured to cyclically control, based on a set of feeder control settings for forming the set of gobs:
        A) actuation of the drive arrangement to reciprocally drive the at least one plunger needle towards and away from the discharge orifice hole;
        B) actuation of the reciprocating shear blade; and
        C) actuation of the cylindrical feeder tube vertical adjustment arrangement to control a vertical offset of the cylindrical feeder tube relative to the bottom of the spout bowl;
    the controller being configured to determine the set of feeder control settings by determining and using an optimal and feasible set of feeder control setting deviations which is a set of deviations from a set of predetermined nominal feeder control settings;
    wherein a magnitude of each feeder control setting deviation has a deviation magnitude range of between zero deviation and a maximum deviation from the corresponding nominal feeder control setting;
    wherein the feeder control setting deviations have a predetermined priority order from lowest priority to highest priority;
    wherein the optimal and feasible set of feeder control setting deviations is feasible if the set of feeder control settings that are determined using the optimal and feasible set of feeder control setting deviations will create the set of gobs with each gob having the corresponding predetermined first physical characteristic value and is optimal if a magnitude of any one of the feeder control setting deviations within the set of feeder control setting deviations is reduced, a magnitude of a feeder control setting deviation having a lower priority must be increased for the set of feeder control setting deviations to be feasible.

2. The control arrangement of claim 1, wherein the predetermined first physical characteristic value of the at least one first gob is different than the predetermined first physical characteristic value of the at least one second gob.

3. The controller arrangement of claim 2, wherein:
the set of feeder control settings includes a first subset of feeder control settings that is all of the uniquely determinable feeder control settings for forming the at least one first gob;
the set of feeder control settings includes a second subset of feeder control settings that is all of the uniquely determinable feeder control settings for forming the at least one second gob; and
at least one of the uniquely determinable feeder control settings of the first subset is different than a corresponding at least one of the uniquely determinable feeder control settings of the second subset such that the predetermined first physical characteristic values of the at least one first and second gobs are different.

4. The control arrangement of claim 1, wherein the lowest priority feeder control setting deviation corresponds to the least desirable feeder control setting to be adjusted from the corresponding nominal feeder control setting and the highest priority feeder control setting deviation corresponds to the most desirable feeder control setting to be adjusted from the corresponding nominal feeder control setting.

5. The control arrangement of claim 1, wherein:
the controller sequentially determines each of the optimal feeder control setting deviations to determine the optimal and feasible set of feeder control setting deviations;
the controller determines the optimal feeder control setting deviation for the least preferred feeder control setting deviation first and the optimal feeder control setting deviation for the most preferred feeder control setting deviation last; and
the controller uses all optimal feeder control setting deviations of the optimal and feasible set of feeder control setting deviations that have been previously determined for determining each subsequent optimal feeder control setting deviation until the controller determines the optimal feeder control setting deviation for the most preferred feeder control setting deviation.

6. The control arrangement of claim 1, wherein at least one of the feeder control setting deviations is in the form of a vector, the vector having a uniquely determinable component for forming each of the plurality of gobs.

7. The control arrangement of claim 6, wherein at least one of the feeder control setting deviations is in the form of a scalar that is applicable for forming all of the plurality of gobs.

8. The control arrangement of claim 1, wherein:
the set of feeder control settings includes feeder control settings for defining a cyclical motion profile of the at least one plunger needle to cyclically reciprocally drive the at least one plunger needle towards and away from the discharge orifice hole, the cyclical motion profile having a motion profile portion for each gob in the set of gobs, each motion profile portion having a period forming the corresponding gob;
the set of feeder control settings includes a feeder control setting for defining actuation timing of the reciprocating shear blade for forming each gob of the set of gobs relative to the corresponding motion profile of the gob; and the set of feeder control settings includes the vertical offset of the cylindrical feeder tube for forming each gob of the set of gobs.

9. The control arrangement of claim 8, wherein the vertical offset is constrained to be the same for forming all gobs of the set of gobs.

10. The system of claim 8, wherein the controller determines, for each motion profile portion:
i) a plunger stroke;
ii) a plunger start time, which is a time within and proximate a beginning of the period of the motion profile portion at which the plunger needle begins to move away from the bottom of the spout bowl;
iii) a plunger end time, which is a time within and proximate an end of the period of the motion profile portion at which the plunger needle stops moving toward the bottom of the spout bowl; and
iv) a plunger needle height, which is a distance between the plunger needle and the spout bottom at the plunger start time.

11. The control arrangement of claim 1, wherein a combined number of adjustable feeder control settings is greater than the combined number of predetermined physical characteristic values used to determine the feeder control settings.

12. The control arrangement of claim 10, wherein the actuation timing of the reciprocating shear blade is a shear differential, which is an offset of the actuation timing of the gob shearing mechanism relative to the plunger end time for each motion profile portion.

13. The control arrangement of claim 1, wherein the system of producing gobs for an individual section machine simultaneously produces a plurality of gobs to be supplied to a same section, the spout bowl includes a plurality of discharge orifice holes corresponding to the plurality of gobs, the at least one plunger needle includes a plurality of plunger needles corresponding to the plurality of discharge orifices, the drive arrangement is operably coupled to the plurality of plunger needles to simultaneously reciprocally drive the plunger needles toward and away from the discharge orifice holes to cyclically emit a plurality of molten glass streams corresponding to the plurality of discharge orifices, the controller is configured such that the predetermined priority order reduces differences between the simultaneously produced plurality of gobs for each section.

14. The control arrangement of claim 1, wherein each gob to be formed has a predetermined second physical characteristic value in addition to the predetermined first physical characteristic, the controller determines the set of feeder control settings for forming the set of gobs such that the optimal and feasible set of feeder control setting deviations is feasible if the set of feeder control settings that are determined using the optimal and feasible set of feeder control setting deviations will create the set of gobs with each gob having the predetermined first physical characteristic value and the second physical characteristic value.

15. The control arrangement of claim 14, wherein the predetermined first physical characteristic value is gob weight and the predetermined second physical characteristic value is gob length.

16. The control arrangement of claim 1, wherein the predetermined first physical characteristic is one of gob weight, gob length and gob shape.

17. The control arrangement of claim 1, wherein:
the controller includes a prioritized optimizer that determines the set of feeder control settings using the first physical characteristic values of the set of gobs as an input to the prioritized optimizer;

the controller is configured to compare actual measured first physical characteristic values for the set of gobs formed using a set of feeder control setting generated by the prioritized optimizer with the predetermined first physical characteristic values used to generate the set of feeder control settings to determine first physical characteristic value errors;

the controller is configured to adjust the predetermined first physical characteristic values used by the prioritized optimizer to determine a subsequent set of feeder control settings for forming a subsequent set of gobs.

18. The control arrangement of claim 1, wherein:

the controller includes a prioritized optimizer that determines the set of feeder control settings using the first physical characteristic values of the set of gobs as an input to the prioritized optimizer;

the controller includes a feeder model that determines predicted first physical characteristic values for the set of actual gobs formed using the set of feeder control settings generated by the prioritized optimizer;

the controller is configured to compare actual measured first physical characteristic values for the set of gobs formed with the predicted first physical characteristic values generated by the feeder model to determine first physical characteristic value errors; and the controller is configured to adjust the predetermined first physical characteristic values used by the prioritized optimizer to determine a subsequent set of feeder control settings for forming a subsequent set of gobs.

19. The control arrangement of claim 18, wherein the prioritized optimizer maintains the set of feeder control settings within operational limits that can result in actual gobs being formed at different than the desired first physical characteristic values.

20. A system for producing gobs for an individual section machine having a plurality of sections including at least a first section and at least a second section, the system cyclically producing a set of gobs including at least one gob for each of the plurality of sections including at least one first gob for the first individual section and at least one second gob for the second individual section, wherein each gob has a predetermined first physical characteristic value, the system producing gobs comprising:

a gob feeder apparatus having:
a spout bowl with at least one discharge orifice hole located in the bottom thereof;
a cylindrical feeder tube within the spout bowl;
a cylindrical feeder tube vertical adjustment arrangement for adjusting the vertical offset of the cylindrical tube feeder relative to the bottom of the spout bowl;
at least one plunger needle located within the feeder tube above the at least one discharge orifice hole; and
a drive arrangement operably coupled to the at least one plunger needle to reciprocally drive the plunger needle toward and away from the discharge orifice hole to emit at least one molten glass stream;

a gob shearing mechanism located below the spout bowl to repeatedly cut the at least one molten glass stream emitted from the discharge orifice hole into the plurality of gobs; and a control arrangement according to claim 1.

21. A method of controlling a system for producing gobs for an individual section machine having a plurality of sections including at least a first section and at least a second section, the system cyclically producing a set of gobs including at least one gob for each of the plurality of sections including at least one first gob for the first individual section and at least one second gob for the second individual section, wherein each gob has a predetermined first physical characteristic value, the system producing gobs including: (1) a gob feeder apparatus and (2) a gob shearing mechanism, the gob feeder apparatus having: (A) a spout bowl with at least one discharge orifice hole located in the bottom thereof; (B) a cylindrical feeder tube within the spout bowl; (C) a cylindrical feeder tube vertical adjustment arrangement for adjusting the vertical offset of the cylindrical tube feeder relative to the bottom of the spout bowl; (D) at least one plunger needle located within the feeder tube above the at least one discharge orifice hole; and (E) a drive arrangement operably coupled to the at least one plunger needle to reciprocally drive the plunger needle toward and away from the discharge orifice hole to emit at least one molten glass stream, the gob shearing mechanism having a reciprocating shear blade located below the spout bowl to cut the at least one molten glass stream emitted from the discharge orifice hole into the set of gobs, the method comprising:

cyclically controlling, with a controller, based on a set of feeder control settings for forming the set of gobs:
A) actuation of the drive arrangement to reciprocally drive the at least one plunger needle towards and away from the discharge orifice hole;
B) actuation of the reciprocating shear blade; and
C) actuation of the cylindrical feeder tube vertical adjustment arrangement to control a vertical offset of the cylindrical feeder tube relative to the bottom of the spout bowl;

determining, by the controller, the set of feeder control settings by determining and using an optimal and feasible set of feeder control setting deviations which is a set of deviations from a set of predetermined nominal feeder control settings, a magnitude of each feeder control setting deviation has a deviation magnitude range of between zero deviation and a maximum deviation from the corresponding nominal feeder control setting, the feeder control setting deviations having a predetermined priority order from lowest priority to highest priority; and the optimal and feasible set of feeder control setting deviations is feasible if the set of feeder control settings that are determined using the optimal and feasible set of feeder control setting deviations will create the set of gobs with each gob having the corresponding predetermined first physical characteristic value and is optimal if a magnitude of any one of the feeder control setting deviations within the set of feeder control setting deviations is reduced, a magnitude of a feeder control setting deviation having a lower priority must be increased for the set of feeder control setting deviations to be feasible.

22. The method of claim 21, wherein the predetermined first physical characteristic value of the at least one first gob is different than the predetermined first physical characteristic value of the at least one second gob.

23. The method of claim 22, wherein:

the set of feeder control settings includes a first subset of feeder control settings that is all of the uniquely determinable feeder control settings for forming the at least one first gob;

the set of feeder control settings includes a second subset of feeder control settings that is all of the uniquely determinable feeder control settings for forming the at least one second gob; and at least one of the uniquely determinable feeder control settings of the first subset is different than a corresponding at least one of the uniquely determinable feeder control settings of the second subset such that the predetermined first physical characteristic values of the at least one first and second gobs are different.

24. The method of claim 21, wherein the lowest priority feeder control setting deviation corresponds to the least desirable feeder control setting to be adjusted from the corresponding nominal feeder control setting and the highest priority feeder control setting deviation corresponds to the most desirable feeder control setting to be adjusted from the corresponding nominal feeder control setting.

25. The method of claim 21, wherein determining an optimal and feasible set of feeder control setting deviations includes:
sequentially determining each of the optimal feeder control setting deviations to determine the optimal and feasible set of feeder control setting deviations by determining the optimal feeder control setting deviation for the least preferred feeder control setting deviation first and determining the optimal feeder control setting deviation for the most preferred feeder control setting deviation last; and
wherein determining each of the optimal feeder control setting deviations includes using all optimal feeder control setting deviations of the optimal and feasible set of feeder control setting deviations that have been previously determined for determining each optimal feeder control setting deviation until the controller determines the optimal feeder control setting deviation for the most preferred feeder control setting deviation.

26. The method of claim 21, wherein at least one of the feeder control setting deviations is in the form of a vector, the vector having a uniquely determinable component for forming each of the plurality of gobs.

27. The method of claim 26, wherein at least one of the feeder control setting deviations is in the form of a scalar that is applicable for forming all of the plurality of gobs.

28. The method of claim 21, wherein:
the set of feeder control settings includes feeder control settings for defining a cyclical motion profile of the at least one plunger needle to cyclically reciprocally drive the at least one plunger needle towards and away from the discharge orifice hole, the cyclical motion profile having a motion profile portion for each gob in the set of gobs, each motion profile portion having a period forming the corresponding gob;
the set of feeder control settings includes a feeder control setting for defining actuation timing of the reciprocating shear blade for forming each gob of the set of gobs relative to the corresponding motion profile of the gob; and
the set of feeder control settings includes the vertical offset of the cylindrical feeder tube for forming each gob of the set of gobs.

29. The method of claim 28, wherein the vertical offset is constrained to be the same for forming all gobs of the set of gobs.

30. The method of claim 28, wherein determining the set of feeder control settings includes determining, with the controller, for each motion profile portion:
i) a plunger stroke;
ii) a plunger start time, which is a time within and proximate a beginning of the period of the motion profile portion at which the plunger needle begins to move away from the bottom of the spout bowl;
iii) a plunger end time, which is a time within and proximate an end of the period of the motion profile portion at which the plunger needle stops moving toward the bottom of the spout bowl; and
iv) a plunger needle height, which is a distance between the plunger needle and the spout bottom at the plunger start time.

31. The method of claim 21, wherein a combined number of adjustable feeder control settings that is determined is greater than the combined number of predetermined physical characteristic values used to determine the feeder control settings.

32. The method of claim 30, wherein the actuation timing of the reciprocating shear blade is a shear differential, which is an offset of the actuation timing of the gob shearing mechanism relative to the plunger end time for each motion profile portion.

33. The method of claim 21, wherein the system of producing gobs for an individual section machine simultaneously produces a plurality of gobs for one of the plurality of sections, the spout bowl includes a plurality of discharge orifice holes corresponding to the plurality of gobs, the at least one plunger needle includes a plurality of plunger needles corresponding to the plurality of discharge orifices, the drive arrangement is operably coupled to the plurality of plunger needles to simultaneously reciprocally drive the plunger needles toward and away from the discharge orifice holes to cyclically emit a plurality of molten glass streams corresponding to the plurality of discharge orifices, the controller is configured such that the predetermined priority order reduces differences between the simultaneously produced plurality of gobs for each section.

34. The method of claim 21, wherein each gob to be formed has a predetermined second physical characteristic value in addition to the predetermined first physical characteristic, the controller determines the set of feeder control settings for forming the set of gobs such that the optimal and feasible set of feeder control setting deviations is feasible if the set of feeder control settings that are determined using the optimal and feasible set of feeder control setting deviations will create the set of gobs with each gob having the predetermined first physical characteristic value and the second physical characteristic value.

35. The method of claim 34, wherein the predetermined first physical characteristic value is gob weight and the predetermined second physical characteristic value is gob length.

36. The method of claim 21, wherein the predetermined first physical characteristic is one of gob weight, gob length and gob shape.

37. The method of claim 21, further comprising:
determining, with a prioritized optimizer of the controller, the set of feeder control settings using the predetermined first physical characteristic values of the set of gobs as an input to the prioritized optimizer;
measuring actual measured first physical characteristic values for the set of gobs formed using the set of feeder control settings generated by the prioritized optimizer;
comparing the measured first physical characteristic values with the predetermined first physical characteristic values to determine first physical characteristic value errors; and adjusting, based on the first physical characteristic value errors, the predetermined first physical characteristic values used by the prioritized optimizer to determine a subsequent set of feeder control settings for forming a subsequent set of gobs.

38. The control arrangement of claim 21, wherein:
determining, with a prioritized optimizer of the controller, the set of feeder control settings using the predetermined first physical characteristic values of the set of gobs as an input to the prioritized optimizer;
determining, with a feeder model of the controller, predicted first physical characteristic values for the set of actual gobs formed using the set of feeder control settings determined by the prioritized optimizer;
measuring actual measured first physical characteristic values for the set of gobs formed using the set of feeder control settings generated by the prioritized optimizer;
comparing the measured first physical characteristic values with the predicted first physical characteristic values to determine first physical characteristic value errors; and
adjusting, based on the first physical characteristic value errors, the predetermined first physical characteristic values used by the prioritized optimizer to determine a subsequent set of feeder control settings for forming a subsequent set of gobs.

* * * * *